(12) United States Patent
Siminoff

(10) Patent No.: US 11,546,951 B1
(45) Date of Patent: Jan. 3, 2023

(54) TOUCHLESS SETUP MODE INITIATION FOR NETWORKED DEVICES

(71) Applicant: Amazon Technologies, Inc., Seattle, WA (US)

(72) Inventor: James Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 153 days.

(21) Appl. No.: 16/169,313

(22) Filed: Oct. 24, 2018

Related U.S. Application Data

(60) Provisional application No. 62/576,713, filed on Oct. 25, 2017.

(51) Int. Cl.
| | |
|---|---|
| *H04W 76/14* | (2018.01) |
| *H04L 12/28* | (2006.01) |
| *G06F 3/01* | (2006.01) |
| *H04N 7/18* | (2006.01) |
| *H04W 76/19* | (2018.01) |

(52) U.S. Cl.
CPC ............ *H04W 76/14* (2018.02); *G06F 3/017* (2013.01); *H04L 12/2807* (2013.01); *H04N 7/186* (2013.01); *H04W 76/19* (2018.02); *H04L 2012/2849* (2013.01)

(58) Field of Classification Search
CPC ....... H04W 76/14; H04W 76/19; G06F 3/017; H04L 12/2807; H04L 2012/2849; H04N 7/186; H04N 7/188–188; G06V 20/40–52
See application file for complete search history.

(56) References Cited

U.S. PATENT DOCUMENTS 6,912,429 B1 * 6/2005 Bilger .................. H05B 47/105
700/19
7,193,644 B2  3/2007 Carter
(Continued)

OTHER PUBLICATIONS

"In-Vehicle Monitoring System and Devices"—U.S. Appl. No. 62/491,638 for Carruthers et al. (U.S. Patent Publication 2021/0097315), filed Apr. 17, 2017 (Year: 2017).*
(Continued)

*Primary Examiner* — Patrice L Winder
*Assistant Examiner* — Angela M De Widhalm Rodriguez
(74) *Attorney, Agent, or Firm* — Lee & Hayes, P.C.

(57) ABSTRACT

A method for causing an audio/video (A/V) recording and communication device to enter a setup mode involves detecting motion by one or more sensors of the A/V recording and communication device, while the A/V recording and communication device is disconnected from a local network. The method also involves entering, by the A/V recording and communication device, a setup mode to initiate a setup procedure after the detected motion. The setup procedure allows the A/V recording and communication device to wirelessly connect to a client device. The method further involves determining whether the client device connects to the A/V recording and communication device within a predetermined timeout period. Additionally, the method involves exiting the setup mode when the A/V recording and communication device does not connect to the client device within the predetermined timeout period.

23 Claims, 15 Drawing Sheets

(56) References Cited

U.S. PATENT DOCUMENTS

| | | | |
|---|---|---|---|
| 8,139,098 B2 | 3/2012 | Carter | |
| 8,144,183 B2 | 3/2012 | Carter | |
| 8,154,581 B2 | 4/2012 | Carter | |
| 8,396,265 B1 | 3/2013 | Ross et al. | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,843,857 B2* | 9/2014 | Berkes | G06F 3/0488 715/863 |
| 8,872,915 B1 | 10/2014 | Scalisi et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,063,574 B1* | 6/2015 | Ivanchenko | G06F 1/32 |
| 9,065,987 B2 | 6/2015 | Kasmir et al. | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi et al. | |
| 9,179,108 B1 | 11/2015 | Scalisi et al. | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,265,001 B1* | 2/2016 | Tannenbaum | H04W 48/16 |
| 9,300,921 B2 | 3/2016 | Naidoo et al. | |
| 9,342,936 B2 | 5/2016 | Scalisi | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 9,811,535 B1* | 11/2017 | Johnson | G06K 9/00335 |
| 9,939,784 B1* | 4/2018 | Berardinelli | G04B 37/1486 |
| 10,075,334 B1* | 9/2018 | Kozura | H04W 12/0609 |
| 10,791,586 B2* | 9/2020 | Ko | H04N 21/44231 |
| 11,042,938 B1* | 6/2021 | Robare | G01C 21/3484 |
| 2004/0201677 A1 | 10/2004 | Bronson | |
| 2006/0046719 A1* | 3/2006 | Holtschneider | H04W 72/10 455/434 |
| 2006/0111125 A1 | 5/2006 | Karaoguz | |
| 2006/0253251 A1 | 11/2006 | Puranik et al. | |
| 2007/0273539 A1* | 11/2007 | Gananathan | H05B 47/11 340/615 |
| 2008/0273754 A1* | 11/2008 | Hick | G08B 13/19652 382/103 |
| 2009/0031258 A1* | 1/2009 | Arrasvuori | G06F 3/04883 715/863 |
| 2009/0221275 A1* | 9/2009 | Trip | H04M 1/72412 455/418 |
| 2010/0281438 A1* | 11/2010 | Latta | G06F 3/017 715/863 |
| 2011/0173574 A1* | 7/2011 | Clavin | G06F 3/017 715/863 |
| 2011/0260829 A1* | 10/2011 | Lee | H04M 1/67 340/5.51 |
| 2011/0314173 A1* | 12/2011 | Lyu | H04L 65/605 709/231 |
| 2012/0236147 A1 | 9/2012 | Addy et al. | |
| 2013/0033379 A1 | 2/2013 | Jentoft | |
| 2013/0120134 A1 | 5/2013 | Hicks, III | |
| 2013/0173794 A1* | 7/2013 | Agerbak | H04W 48/18 709/225 |
| 2014/0031992 A1 | 1/2014 | Bergman et al. | |
| 2014/0132763 A1 | 5/2014 | Billau et al. | |
| 2014/0149859 A1* | 5/2014 | Van Dyken | H04L 29/08117 715/702 |
| 2014/0176436 A1* | 6/2014 | Raffa | G06F 3/017 345/158 |
| 2014/0206287 A1* | 7/2014 | Chang | H04W 4/025 455/41.2 |
| 2014/0293046 A1 | 10/2014 | Ni | |
| 2014/0351617 A1* | 11/2014 | Connell | G06F 1/3206 713/323 |
| 2015/0096876 A1* | 4/2015 | Mittleman | H04N 5/77 200/341 |
| 2015/0116107 A1* | 4/2015 | Fadell | G08B 27/003 340/501 |
| 2015/0261306 A1* | 9/2015 | Lake | G06F 3/011 340/5.1 |
| 2015/0327060 A1* | 11/2015 | Gilson | H04L 67/16 726/7 |
| 2015/0338925 A1* | 11/2015 | Bernstein | G06T 1/60 345/156 |
| 2015/0373123 A1* | 12/2015 | Warrick | H04L 67/303 709/228 |
| 2016/0088707 A1* | 3/2016 | Van De Sluis | G06F 1/1694 315/149 |
| 2016/0105644 A1 | 4/2016 | Smith et al. | |
| 2016/0143079 A1* | 5/2016 | Yoon | H04W 4/80 455/41.1 |
| 2016/0173578 A1* | 6/2016 | Sharma | H04L 51/02 709/203 |
| 2016/0227596 A1* | 8/2016 | Otani | H04W 8/005 |
| 2016/0232778 A1* | 8/2016 | Honjo | G08B 25/001 |
| 2016/0371048 A1* | 12/2016 | Morris | G06F 40/166 |
| 2017/0225690 A1* | 8/2017 | Elnajjar | B60W 50/08 |
| 2017/0243472 A1 | 8/2017 | Davies et al. | |
| 2017/0257602 A1 | 9/2017 | Axson et al. | |
| 2017/0364257 A1* | 12/2017 | Zhu | G08C 17/02 |
| 2018/0019889 A1 | 1/2018 | Burns et al. | |
| 2018/0110077 A1* | 4/2018 | Mandapaka | A61B 5/0004 |
| 2018/0367731 A1* | 12/2018 | Gatti | G06K 9/00791 |
| 2020/0058152 A1* | 2/2020 | Zhang | G06T 9/00 |
| 2020/0191913 A1* | 6/2020 | Zhang | G01S 7/006 |
| 2020/0201444 A1* | 6/2020 | Stoyles | G06T 7/74 |
| 2020/0305839 A1* | 10/2020 | Wohlschlager | G06F 3/044 |
| 2020/0358981 A1* | 11/2020 | Lee | H04N 7/147 |
| 2020/0405223 A1* | 12/2020 | Mai | A61B 5/0816 |
| 2021/0097315 A1* | 4/2021 | Carruthers | H04W 4/40 |

OTHER PUBLICATIONS

U.S. Patent and Trademark Office, Non-Final Office Action issued in U.S. Appl. No. 16/747,749, dated Mar. 18, 2021, 16 pgs.

U.S. Patent and Trademark Office, Final Office Action issued in U.S. Appl. No. U.S. Appl. No. 16/747,749, dated Aug. 23, 2021, 16 pgs.

* cited by examiner

TOUCHLESS SETUP MODE INITIATION FOR NETWORKED DEVICES

CROSS-REFERENCE TO RELATED APPLICATION

This application claims the benefit of priority to U.S. provisional application No. 62/576,713, filed on Oct. 25, 2017, now pending, the entire contents of which are hereby incorporated by reference.

FIELD OF THE DISCLOSURE

The present embodiments relate to audio/video (A/V) recording and communication devices, including A/V recording and communication doorbells, security cameras, and floodlight controllers. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. A/V recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present touchless setup mode initiation for networked devices now will be discussed in detail with an emphasis on highlighting the advantageous features. These embodiments depict the novel and non-obvious touchless setup mode initiation for networked devices shown in the accompanying drawings, which are for illustrative purposes only. These drawings include the following figures, in which like numerals indicate like parts.

DETAILED DESCRIPTION

Figure 1A:
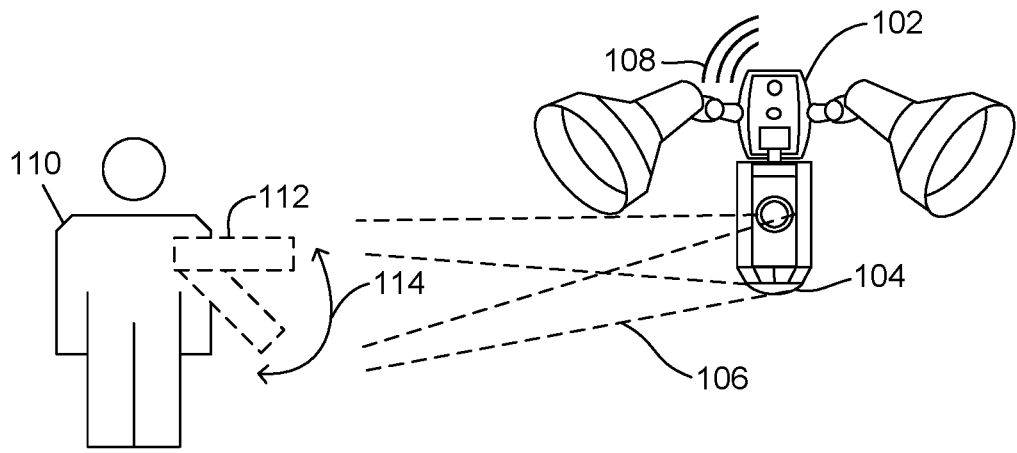
FIGS. 1A, 1B, and 1C are schematic diagrams of respective portions of an example setup mode procedure, according to various aspects of the present disclosure.

Networked devices (e.g., computing devices, home automation devices, security devices, IoT ("Internet of Things") devices, backend servers, etc.) are often designed to communicate with a wireless local area network (WLAN) in order to perform their various functions. For instance, an A/V recording and communication device may be configured to connect to a user's home network (e.g., a WLAN created by a router), which itself is connected to the Internet or another wide area network (WAN). The A/V recording and communication device, once connected to the WLAN, is then capable of performing network-based operations (e.g., transmitting audio/video data, receiving software updates, etc.).

In some circumstances, a networked device may be mounted or otherwise situated in a location that is difficult to access. For instance, a security camera might be mounted in a high location on an exterior wall of a user's home. Such a mounting location may be desirable in order to reduce the likelihood of theft, and/or to provide a wider field-of-view. Regardless of the reason, the networked device may be situated in a location that is difficult for the user to reach.

The networked device, while situated in its hard-to-reach location, may become disconnected from a local network due to changes in the local network's configuration (e.g., a change in service set identifier (SSID), password, security protocol such as WEP, WPA, WPA2, frequency band, channel, etc.), for example. Once disconnected, the networked device may no longer be able to perform some or all of its functions. For example, an A/V recording and communication device may not be able to upload captured images or video data to a backend server without access to the Internet via the local network. If the networked device has a physical interface or button to reset the device or initiate a setup procedure, the user would typically use a ladder to reach the device and interact with that physical interface. This type of activity may put the user at risk of injury, or at best, is an inconvenience to the user.

Embodiments described herein address this problem by equipping networked devices with sensors for detecting motion, images, sounds, and/or other known patterns that cause the networked device to enter into a setup mode without making physical contact with the networked device. As one example, the networked device may include a camera for capturing a sequence of images or video and a computer vision module for processing the captured images or videos. Such a networked device may perform object detection, gesture recognition, and/or other image or video processing to determine whether or not a particular gesture has occurred. If the networked device recognizes the particular gesture, then it may transition into a setup mode to begin a setup procedure for configuring (or re-configuring) the networked device.

As a specific example, a networked device of the present application may be configured to detect a gesture involving a hand periodically transitioning between an "outstretched" state (with all fingers extended outward and the palm facing the camera of the device) and a "fist" state (with all fingers curled inward toward the palm), at some threshold distance from the networked device. In this example, the networked device may capture a series of images or video frames of the user's hand periodically moving between the outstretched and fist states.

The networked device may then process the images or video frames to determine whether the above-described gesture has occurred. For instance, the networked device may perform object recognition on each of the frames to detect whether a fist, an outstretched hand, or neither is present. If multiple alternating fists and outstretched hands are detected, then the networked device may determine that the gesture was detected, and in turn enter into a setup mode.

Alternatively, and/or additionally, the networked device may process the series of images or frames to extract a set of features in each image or frame. For example, a virtual hand "skeleton" may be extracted, representing a simplified model of the user's hand that maps the relative location of each joint with respect to the other joints. When the hand is outstretched, the distal joints of the fingers are positioned far from the palm, and each finger forms a substantially straight set of joints. When the hand is clenched in a fist, the joints converge around the palm. These feature patterns may be identified through manual coding or trained into a machine learning model, such that the networked device can determine whether it detects a fist, an outstretched hand, or neither in each of the frames. As with the previous technique, the networked device may determine that the gesture has occurred if it detects multiple alternating fists and outstretched hands. If the networked device recognizes the gesture, the networked device may transition into a setup mode.

In other implementations, the networked device may be configured to detect other types of "gestures," involving some combination of detected motion, object recognition, sound frequencies or rhythms, and/or other physical phenomena. For instance, the networked device may include a microphone for detecting a particular sequence of frequencies or notes played according to a predetermined rhythm. A client device (e.g., a smartphone) may generate those sounds through a speaker, and the sounds are then detected by the networked device and cause the networked device to initiate a setup procedure. Other types of "gestures" or touchless triggers are also possible.

Regardless of the particular gesture, the networked device in a setup mode may broadcast a wireless network, to which a client device or other computing device can directly connect. For example, the networked device may include software and/or hardware to provide a wireless access point, such that the networked device can act as a router to allow a client device to connect to it over Wi-Fi. Alternatively, and/or additionally, the networked device may broadcast a different wireless network or communication protocol, such as Bluetooth.

If no client device or other computing device connects to the networked device within some predetermined period of time, the networked device may automatically stop broadcasting the wireless network and exit the setup mode. However, if a client device does establish a direct wireless connection with the networked device, the networked device may continue through a setup procedure and await receipt of setup instructions. The client device may execute an application to guide the user through a setup process, and allow the user to configure operational aspects of the networked device, including the network settings and credentials. These network credentials may be transmitted, along with other possible configuration information, as setup instructions to the networked device. The networked device may then, after receiving the setup instructions, exit the setup mode and proceed to connect to the wireless network associated with the received network credentials.

In some embodiments, the networked device may be configured to enter into a low-power state if the networked device is not connected to a network. The low-power state may disable one or more hardware and/or software subsystems in order to reduce power consumption by the networked device, which may be desirable in particular circumstances (e.g., for battery-powered networked devices). The low-power state or mode is described in more detail below.

As described herein, "sensor" may refer to any device, module, or system that detects and/or measures physical phenomena in an environment and converts that phenomena into a signal or data. A sensor may measure light (e.g., ambient, particular band or wavelengths, amount of reflected light, infrared representing heat, etc.), motion, sound, temperature, magnetic fields, vibration, and/or other physical properties. In some embodiments, a "sensor" may refer to an array of photodetectors that collectively capture an image (e.g., a complementary metal-oxide-semiconductor (CMOS) sensor, a charge-coupled device (CCD) sensor, etc.).

The term "sensor" may encompass not only a transducer element, but also processing elements related to that transducer. For example, an object recognition engine may detect the presence (or absence) of a particular type of object within an image captured by an image sensor; in this example, the image sensor and object recognition engine (which may be implemented with some combination of hardware and/or software elements) may herein be referred to collectively as a "sensor." As another example, a passive infrared (PIR) "sensor" may include two or more infrared light photodetectors, a specialized lens element (e.g., a Fresnel lens), and circuitry for detecting movement of a particular infrared light source (e.g., infrared light produced by the heat of a human body) across those two or more infrared light photodetectors. The term "sensor" may encompass all of these related elements which collectively enable the PIR sensor to detect motion.

As described herein, a "gesture" may refer to a sequence of events detected by the sensor that precisely or approximately corresponds to a predetermined or known sequence of events. As a specific example, an image sensor may capture a sequence of images which are provided to an object recognition engine, which in turn identifies a person in the image and identifies a virtual "skeleton" of that person. If the virtual skeleton of the person (or a portion of the virtual skeleton, such as a hand of the person) changes from image-to-image in accordance with a known sequence, then a gesture associated with that known sequence may be detected. As another example, a particular pattern, frequency, and/or rhythm of sound may be captured by a microphone; if the pattern, frequency, and/or rhythm matches (approximately or precisely) a known sequence, then an audio gesture may be recognized. In some embodiments, a "gesture" may generally refer to a detected input from a touchless interface.

As described herein, a "setup mode" may refer to a particular mode of operation of an A/V recording and communication device, networked device, or other computing device, in which the device is capable of receiving data for configuring the device, such as setup instructions. In some instances, the setup mode may enable and/or disable particular subsystems or modules within the device. For example, a device in setup mode may enable a WAP and begin broadcasting a wireless network, to which other devices can connect (e.g., Wi-Fi, Bluetooth, etc.). As another example, a device in setup mode may disable particular normal mode features in order to enter a reduced power state, which may involve powering down particular subsystems (e.g., speakers, microphones, light emitters, etc.) and/or disabling particular software routines (e.g., some types of computer vision used in normal operation, trigger detection to begin recording video and/or audio, etc.). The setup mode may also involve performing some or all of a setup procedure.

As described herein, a "setup procedure" may refer to one or more operations or steps performed by an A/V recording and communication device, networked device, or other computing device while in setup mode. The setup procedure may involve, for example, initiating the transmission of a wireless network via a WAP of the device. The setup procedure might also involve establishing a direct wireless connection with another device, from which setup instructions may be received. In some implementations, the setup procedure involves initiating a timeout procedure, where a particular operation is set to stop at a predetermined future time relative to a start time of that procedure. For example, a setup procedure may involve activating a WAP to begin broadcasting a wireless network for five minutes. If no other device establishes a direct wireless connection with the device in setup mode within that five-minute window, the setup procedure may automatically disable the WAP, stop broadcasting the wireless network, and continue normal operation (or operation in some other mode). Multiple timeouts may be set depending on the particular setup procedure.

As described herein, "setup instructions" may refer to any signals or data transmitted from a computing device to a device in setup mode that relate to the configuration or operation of the device in setup mode. For example, the setup instructions may include network credentials for a WLAN (e.g., a user's home network, a workplace network, etc.). Those network credentials may be stored by the device in setup mode and, after exiting setup mode, may be used by that device to establish a wireless connection with the wireless network associated with the network credentials. The setup instructions may also include other information, such as user-specified parameters or options related to the operation of a device (e.g., account information for uploading recorded audio/video data to a server, a nickname for the device, etc.).

As described herein, a "reduced power mode" or "reduced power state" may refer to a mode of operation of a device in which one or more hardware and/or software subsystems are disabled in order to reduce power consumption. A reduced power state may be desired if a device in not capable of normal operation. For example, if a device which depends on a network connection is disconnected from the network (e.g., if the network credentials are changed), then that device may not be able to perform all of its functionality. In order to conserve power, the device that is disconnected from the network may enter a reduced power state. A reduced power mode may also disable (or reduce the frequency of) execution of one or more software subroutines. For instance, an image processing software subroutine may be periodically performed to determine whether a person is present within a field-of-view of a camera. The reduced power mode may cause that subroutine to execute less frequently than normal, or not execute at all, depending on the particular implementation. Additionally, or alternatively, a reduced power mode may include disabling one or more hardware components of the device, such as one or more cameras, for example.

As described herein, an "association" may describe a wireless data connection between two devices. For example, an A/V device may create an association between a client device while the A/V device is in a setup mode and is broadcasting a wireless network. The client device may "associate" with the A/V device by connecting to a wireless data channel of the A/V device.

The remaining detailed description describes the present embodiments with reference to the drawings. In the drawings, reference numbers label elements of the present embodiments. These reference numbers are reproduced below in connection with the discussion of the corresponding drawing features.

Figure 1B:
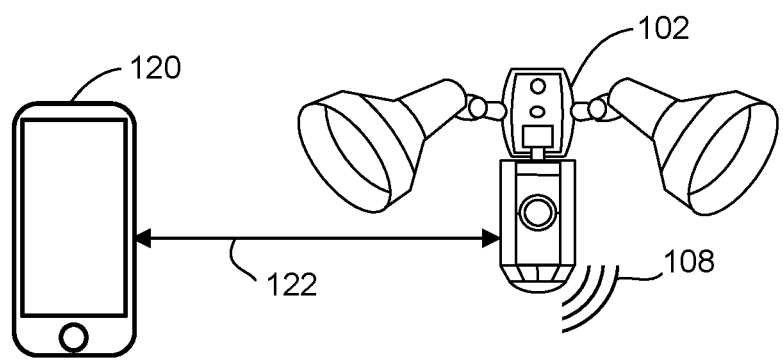
Figure 1C:
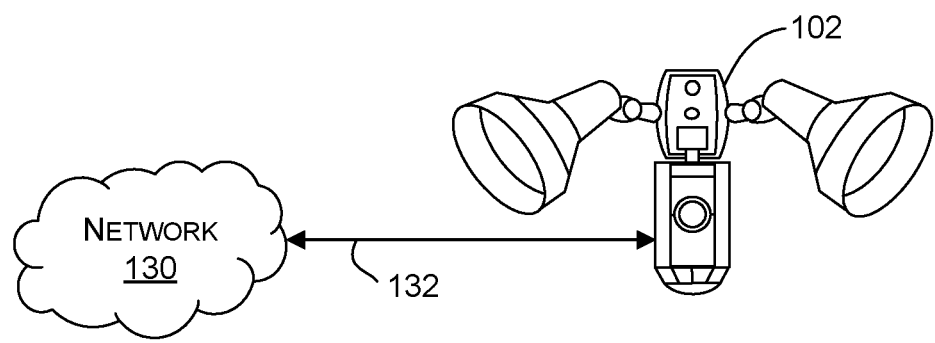

FIGS. 1A, 1B, and 1C are schematic diagrams of various respective portions of an example setup mode procedure, according to various aspects of the present disclosure. In FIG. 1A, an A/V recording and communication device ("A/V device") 102 is equipped with sensor(s) 104 and/or a camera 105 that capture images, motion, and/or audio within a field-of-view 106. A user 110, positioned within the field-of-view 106, makes a gesture 114 with the user's arm 112. The sensor(s) 104 of the A/V device 102 detect and/or capture the gesture 114, and attempt to determine whether the gesture 114 represents one or more predetermined gestures. In this example, the gesture 114 is recognized by the A/V device 102 to be a gesture for entering a setup mode and/or initiating a setup procedure by the A/V device 102. Entering the setup mode involves broadcasting a wireless network 108 by a wireless access point (WAP) of the A/V device 102, in this example.

In some embodiments, the A/V device 102 enters the setup mode for a predetermined duration of time. This aspect allows the A/V device 102 to exit the setup mode if the A/V device 102 does not connect to another computing device and/or receive setup instructions during that "timeout" period. Such a timeout may be desirable in the event that the user 110 performed the gesture 114 by accident or if the A/V device 102 falsely detects the occurrence of the gesture 114. The timeout period may be extended, reset, or ignored, depending on whether subsequent events occur, examples of which are described in more detail below.

After the A/V device 102 has entered the setup mode and begins broadcasting the wireless network 108, a client device 120 detects the wireless network 108, connects to the wireless network 108, and thereby establishes a direct wireless connection 122 with the A/V device 102, as shown in FIG. 1B. The client device 120 may execute an application or other software for configuring the A/V device 102 while the direct wireless connection 122 is established. For example, the client device 120 may include an application (e.g., an application distributed by the manufacturer of the A/V device 102) that provides a user interface to facilitate a setup procedure of the A/V device 102. This setup procedure may involve the client device 120 transmitting setup instructions to the A/V device 102 via the direct wireless connection 122. The setup instructions may include information related to a user's home network (or other WLAN), such as network credentials (e.g., network service set identifier (SSID), password, security protocol type, etc.) for connecting to a network 130 (shown in FIG. 1C).

After the setup process is complete and the A/V device 102 has received, among other information, the network credentials for the network 130, the A/V device 102 then exits the setup mode. Exiting the setup mode may involve disabling the WAP of the A/V device 102, and disconnecting the direct wireless connection 122 with the client device 120. Using the received network credentials, the A/V device 102 establishes a wireless connection with the network 130, as shown in FIG. 1C. The network 130 may be a WLAN provided by a router or the like.

Figure 2:
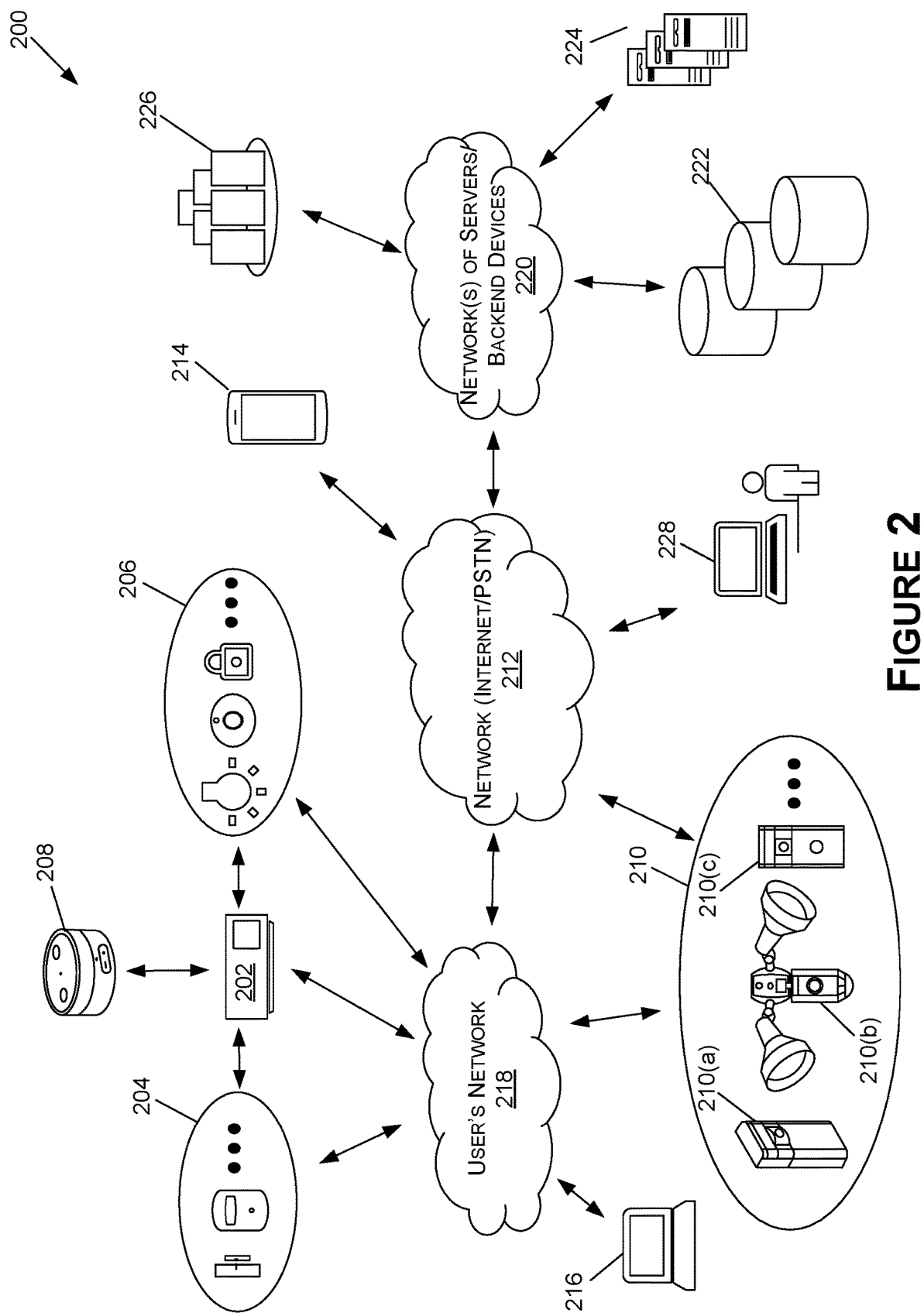
FIG. 2 is a functional block diagram illustrating a system for communicating in a network according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, etc.), when remotely monitored and controlled via a network (Internet/ a public switched telephone network (PSTN)) 212 (which may be similar to, and represent the network 112), may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system may be controlled through various user interfaces, such as voice commands and/or a touchscreen. Various examples, of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low-power wide-area network (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN. The network 130 of FIG. 1C may be an example of a user's network 218.

The system 200 may include one or more A/V recording and communication devices 210 (alternatively be referred to herein as "A/V devices 210" or "A/V device 210") (which may represent, and/or be similar to, the A/V device 102 of FIG. 1). The A/V devices 210 may include security cameras 210(*a*), light cameras 210(*b*) (e.g., floodlight cameras, spotlight cameras, etc.), video doorbells 210(*c*) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a smart-home hub device 202 (which may alternatively be referred to herein as the "hub device 202") connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216 (which may represent, and/or be similar to, the client device 120 of FIG. 1). The client devices 214, 216 may communicate with and/or be associated with (e.g., capable of access to and control of) the A/V devices 210, a smart-home hub device 202, the VA device 208, sensors 204, and/or automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The AN devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more backend servers 224, and one or more backend application programming interfaces (APIs) 226. While FIG. 2 illustrates the storage device 222, the backend server 224, and the backend API 226 as components separate from the network 220, it is to be understood that the storage device 222, the backend server 224, and/or the backend API 226 may be considered to be components of the network 220. For example, the network 220 may include a data center with a plurality of computing resources used to implement the storage device 222, the backend server 224, and the backend API 226.

The backend server 224 may comprise a computer program or other computer executable code that, when executed by processor(s) of the backend server 224, causes the backend server 224 to wait for requests from other computer systems or software (clients) and provide responses. In an embodiment, the backend server 224 shares data and/or hardware and/or software resources among the client devices 214, 216. This architecture is called the client-server model. The client devices 214, 216 may run on the same computer or may connect to the backend server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various embodiments, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34 bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking. The network 130 of FIG. 1 may include the network 220 described herein.

The hub device 202, the VA device 208, and/or any of the components of the network(s) of servers/backend devices 220 (e.g., the backend server 224, the backend API 226, the storage devices 222, etc.) may be referred to herein as a "network device" or "network devices."

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control their own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

Figure 3:
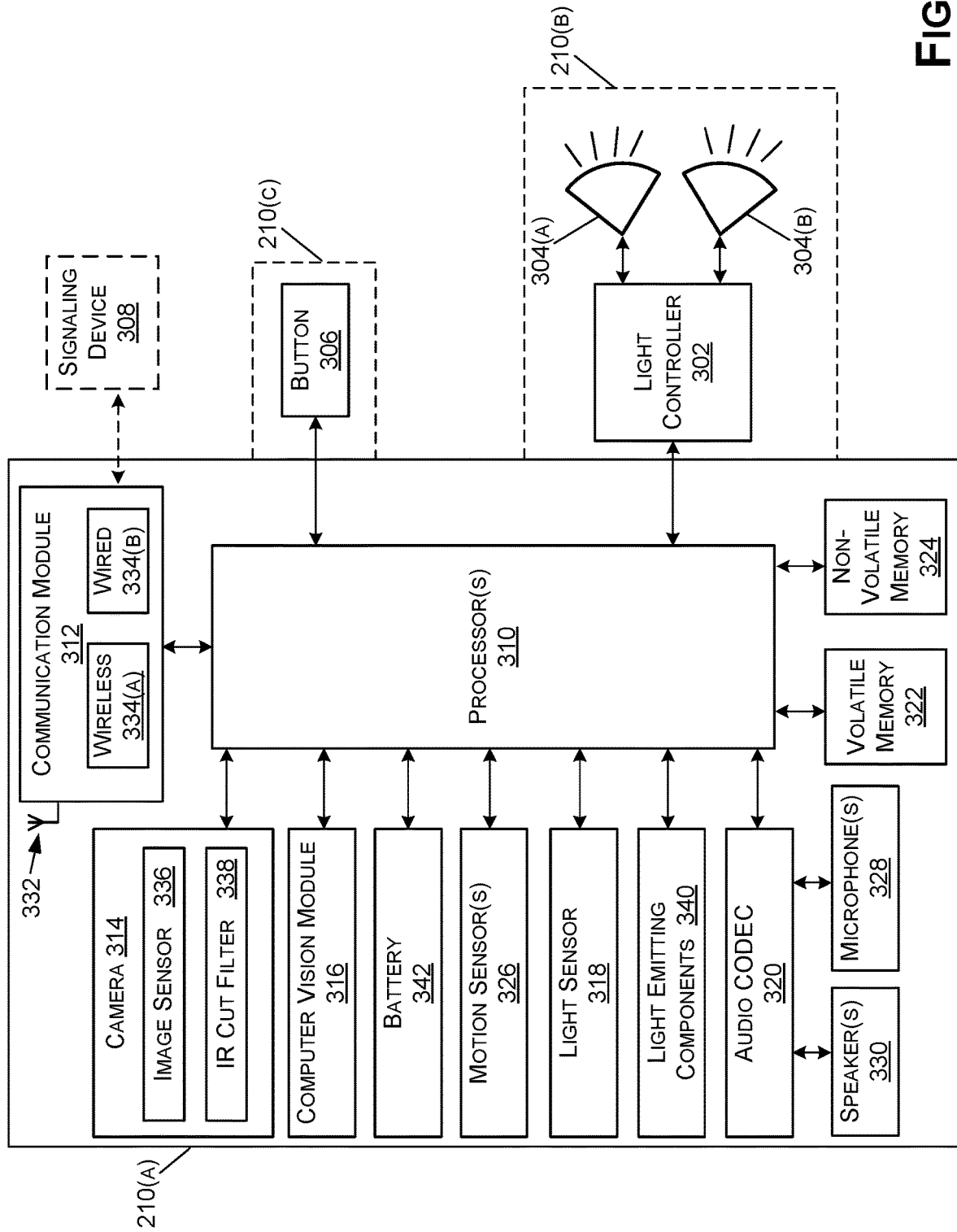
FIG. 3 is a functional block diagram of an A/V recording and communication device according to various aspects of the present disclosure.

FIG. 3 is a functional block diagram for an audio/video (A/V) device according to various aspects of the present disclosure. In some embodiments, the one or more A/V devices 210 may include the security camera 210(*a*). In other embodiments, the one or more A/V devices 210 may include the light camera 210(*b*), which may include some or all of the components of the security camera 210(*a*) in addition to a light controller 302 and one or more lights 304(*a*), 304(*b*). In some embodiments, the one or more A/V devices 210 may include the video doorbell 210(*c*), which may include some or all of the components of the security camera 210(*a*) in addition to a button 306, and in some embodiments, a connection to a signaling device 308 (e.g., a pre-installed signaling device, such as a wired signaling device, and/or a wireless signaling device, connected over Wi-Fi, BLE, or the another wireless communication protocol).

With further reference to FIG. 3, the A/V device 210 may include a processor(s) 310, a communication module 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller") may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the communication module 312, and may perform various functions as described in the present disclosure. In various embodiments, when the processor(s) 310 is triggered by the motion sensor(s) 326, the camera 314, the speaker(s) 330, the microphone(s) 328, the communication module 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication module 312 and the camera 314.

With further reference to FIG. 3, the communication module 312 may comprise an integrated circuit including a processor core, memory, and programmable input/output peripherals. The communication module 312 may be operatively connected to the processor(s) 310. In some embodiments, the communication module 312 is configured to handle communication links between the A/V device 210 and other, external devices, external receivers, external transmitters, and/or external transceivers, and to route incoming/outgoing data appropriately. For example, inbound data from an antenna 332 of the communication module 312 may be routed through the communication module 312 before being directed to the processor(s) 310, and outbound data from the processor(s) 310 may be routed through the communication module 312 before being directed to the antenna 332 of the communication module 312. As another example, the communication module 312 may be configured to transmit data to and/or receive data from a remote network device (e.g., one or more components of the network(s) of servers/backend devices 220 described in FIG. 2). The communication module 312 may include wireless 334(*a*) and wired 334(*b*) adapters. For example, the communication module 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The communication module 312 may receive inputs, such as power and/or data, from the camera 314, the processor(s) 310, the button 306 (in embodiments where the A/V device 210 is the video doorbell 210(*c*)), the motion sensors 326, a reset button (not shown in FIG. 3 for simplicity), and/or the non-volatile memory 324. The communication module 312 may also include the capability of communicating over wired connections, such as with a signaling device 308. For example, when the button 306 of the video doorbell 210(*c*) is pressed, the communication module 312 may be triggered to perform one or more functions, such as to transmit a signal over the wired 334(*b*) connection to the signaling device 308 (although, in some embodiments, the signal be transmitted over a wireless 334(*a*) connection to the signaling device) to cause the signaling device 308 to emit a sound (e.g., a doorbell tone, a user customized sound, a ringtone, a seasonal ringtone, etc.). The communication module 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 722p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the communication module 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 229 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the recording and communication A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the communication module 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the communication module 312 to the network 212 via the user's network 218, routed by the backend server 224 and/or the backend API 226 and delivered to the client device(s) 214, 216 as described above in connection with FIG. 2. When the user speaks, after being transferred through the network 212, the user's network 218, and the communication module 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance), that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motions sensor(s) 326 and/or the camera 314 detecting motion, the light controller 236 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(c), the A/V device 210 may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the communication module 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the communication module 312, to the client device(s) 214, 216 to indicate to the user(s) of the client device(s) 214, 216 that a person is present at the A/V device 210 (in some embodiments, via at least one of the hub device 202, the VA device 208, and/or one or more component of the network of servers/backend devices 220).

Although the A/V recording and communication device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 4:
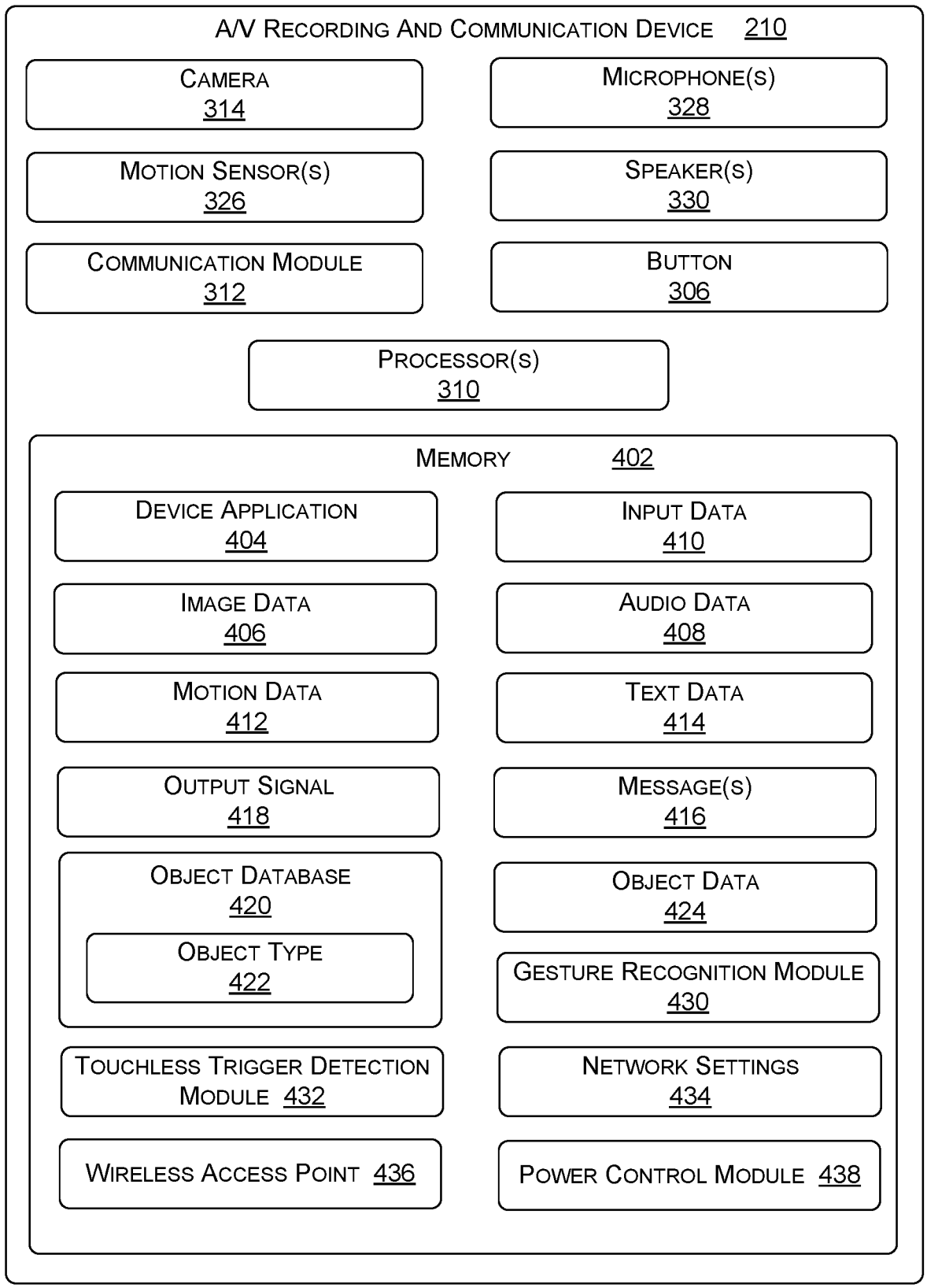
FIG. 4 is a functional block diagram illustrating one example embodiment of an A/V recording and communication device according to various aspects of the present disclosure.

FIG. 4 is another functional block diagram illustrating an embodiment of the A/V device 210 according to various aspects of the present disclosure. In some embodiments, the A/V device 210 may represent, and further include one or more of the components from, the A/V recording and communication doorbell 210(c), the A/V recording and communication security camera 210(a), and/or the floodlight controller 210(b). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may configure the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

In addition, the device application 404 may configure the processor(s) 310 to transmit the image data 406, the audio data 408, the motion data 412, the input data 410, the text data 414, and/or message(s) 416 to the client devices 214, 216, the hub device 202, and/or the backend server 224 using the communication module 312. In various embodiments, the device application 404 may also configure the processor(s) 310 to generate and transmit an output signal 418 that may include the image data 406, the audio data 408, the text data 414, the input data 410, and/or the motion data 412. In some of the present embodiments, the output signal 418 may be transmitted to the backend server 224 and/or the hub device 202 using the communication module 312. The backend server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the backend server 224, and the backend server 224 may then transmit (or forward) the output signal 418 to the client device(s) 214, 216. In other embodiments, the output signal 418 may be transmitted directly to the client device(s) 214, 216 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video.

The image data 406 may be recorded by the camera 314 in a field of view of the camera 314.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(*c*)), the A/V device 210 may not include the button 306, and the A/V device 210 may not generate the input data 410.

With further reference to FIG. 4, a message 416 may be generated by the processor(s) 310 and transmitted, using the communication module 312, to the client device 214, 216, the backend server 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia messages (MMS), voicemail messages, video signals, audio signals, data transmissions, and/or any other type of electronic communication that an electronic device can send to another electronic device.

The image data 406, the audio data 408, the text data 414, and/or the motion data 412 may be tagged with (e.g., a time stamp, based on clock data) and/or stored separately (e.g., on the backend server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the backend server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

For example, the device application 404 may configure the processor(s) 310 to analyze the image data 406 in order to determine if the image data 406 depicts an object. Objects may include, but are not limited to, people, animals, vehicles, parcels (e.g., packages), electronic devices (e.g., remote control vehicles, drones, etc.), and/or any other type of object that can be depicted by the image data 406 and/or cause motion that can be detected by the A/V device 210. In some examples, the processor(s) 310 of the A/V recording and communication device 210 may analyze the image data 406 whenever the camera 314 of the A/V recording and communication device 210 captures the image data 406.

In some examples, to analyze the image data 406, computer vision processing and/or image processing, as described herein, for example, may be performed by the processor(s) 310 of the A/V device 210 to determine that the image data 406 depicts one or more objects. For example, in any of the present embodiments, the image data 406 generated by the A/V device 210 may be analyzed to determine object data 420. In some of the present embodiments, one or more of the image data 406, the motion data 412, and the audio data 408 may be used to determine the object data 424. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or super-quadrics, for example.

In some embodiments, the processor(s) 310 of the A/V device 210 may compare the object data 424 to an object database 420 to determine what, if any, object(s) the image data 406 depicts in the field of view of the A/V device 210. For example, the object database 420 may store image data corresponding to images and/or video footage that depict various objects, where the image data may be labeled (e.g., tagged, such as in the form of metadata) to indicate an object type 422 (alternatively referred to herein as the "type of object 422") depicted by each image and/or video footage. For a first example, the object database 420 may store image data depicting a person, where the image data is labeled to indicate that the type of object 422 includes a person. For a second example, the object database 420 may store image data depicting an animal (e.g., a dog, a cat, a coyote, etc.), where the image data is labeled to indicate that the type of object 422 includes the animal (e.g., the dog, the cat, the coyote, etc.). For a third example, the object database 420 may store image data depicting a vehicle, where the image data is labeled to indicate the type of object 422 includes the vehicle.

Based on the comparing, the processor(s) 310 of the A/V device 210 may match the object data 424 from the image data 406 to the image data stored in the object database 420. The processor(s) 310 of the A/V device 210 may then use the match to determine that the object data 424 represents an object and/or to determine the type of object 422 that the object data 424 represents. For example, if the processor(s) 310 of the A/V device 210 matches the object data 424 from the image data 406 to image data stored in the object database 420 that represents a person, then the processor(s) 310 of the A/V device may determine that the image data 406 depicts an object and/or that the image data 406 depicts a person. In some examples, when the object data 424 represents multiple objects, the processor(s) 310 of the A/V device 210 may perform a similar analysis to identify each object represented by the object data 424 and/or the respective type of object 422 associated with each of the objects represented by the object data 424.

In some examples, in addition to, or alternatively from, comparing the image data 406 to the image data stored in the object database 420, features and/or characteristics of various objects may be stored in the object database 420, and the features and/or characteristics of the objects in the image data 406 may be determined (e.g., using computer vision processing, image processing, or the like) and compared against the features and/or characteristics from the object database 420. For example, sizes, volumes, weights, colors, movement types, and/or other features and/or characteristics of various objects may be stored in the object database 420. The size, volume, weight, color, movement type, and/or other features and/or characteristics of an object depicted by the image data 406 may then be compared to the sizes, volumes, weights, colors, movement types, and/or other features and/or characteristics stored in the object database 420 to identify the type of object 422 depicted by the image data 406.

As described herein, at least some of the processes of the backend server 224, the hub device 202, and/or the client device 214, 216 may be executed by the A/V device 210.

The A/V device 210 may include a gesture recognition module 430. The gesture recognition module 430 may use elements of the A/V device 210—such as the camera 314, the motion sensor(s) 326, the object data 424, and/or the object database 420, among other elements—in order to detect, recognize, and/or identify the occurrence of gestures. For example, a simple "waving" gesture, whereby a user's hand moves repeatedly from side to side or up and down, may be detected by identifying a pattern by the motion sensor(s) 326. The pattern may involve detecting periodic side-to-side or up-and-down movement by the motion sensor(s) 326, for some number of iterations (e.g., three cycles or more).

The above-described "waving" gesture may additionally, or alternatively, be recognized from the image data 406 captured by the camera 314. The image data 406 may be processed to determine the object data 424, as described above, and compared against the object database 420 to determine its object type 422. For instance, the image data 406 may include a human, which can be processed to determine its virtual skeleton (e.g., of the entire body, one or both hands, etc.). The skeleton data (e.g., the locations of different virtual skeleton nodes for two or more images) may be provided to the gesture recognition module 430, which then determines whether the movement of that virtual skeleton over two or more images represents the waving gesture—which might include an approximately static hand skeleton that translates and/or rotates from frame-to-frame, but whose nodes (e.g., finger and hand joints) stay relatively fixed with respect to each other. The gesture recognition module 430 may store a representation of one or more gestures as a model, encode one or more gestures into a machine learning algorithm (e.g., a recurrent neural network (RNN), two or more cascaded convolutional neural networks (CNN), or some other classifier or combination of classifiers).

The gesture recognition module 430 may observe a plurality of different movement parameters, including translation (including forward-to-backward movement or "depth" detection), rotation, and relative movement of each "node" of a virtual skeleton. For instance, a person performing jumping jacks may have a virtual skeleton with nodes at the extremities (hands and feet) periodically departing from and returning to a central body axis (e.g., the spine). The gesture recognition module 430 may include a combination of hardware and/or software for identifying and/or measuring these features, and detecting patterns in the changes of those features as representing a particular gesture.

The AN device 210 may also include a touchless trigger detection module 432, which might include similar processing elements as described above with respect to the gesture recognition module 430. The touchless trigger detection module 432 may use other types of sensors, such as the microphone(s) 328, in order to detect "gestures" in a domain that is different from that of the gesture recognition module 430. For instance, the touchless trigger detection module 432 may detect a particular sound frequency, sequence of frequencies or notes, and/or a rhythm of frequencies or notes that correspond to an audio gesture. A client device may, for example, audibly play a stored audio file in proximity to the A/V device 210 to produce a sequence of sounds associated with a known audio gesture. The touchless trigger detection module 432 may determine that the sequence of sounds produced by the client device is associated with an audio gesture for entering a setup mode. In this manner, the A/V device 210 can be put into setup mode without physical contact with the A/V device 210.

The A/V device 210 may also include network settings 434, which may include any combination of a network SSID, password, encryption type, security protocol, and/or other network credentials. The A/V device 210 may use the network settings 434 to establish (or attempt to establish) a network connection with a router or other networking device. During a setup procedure, the A/V device 210 may receive setup instructions that supplement, replace, or overwrite the network settings 434 with received network credentials. The network settings 434 may include network credentials respective of one, or more than one, router or other networking device(s).

The A/V device 210 may include a wireless access point 436, which might include any combination of hardware and/or software to enable the A/V device 210 to create a wireless network and act as a WAP. The wireless access point 436 may broadcast a wireless network, with a predetermined SSID and/or password, to allow other computing devices to directly connect to the A/V device 210 (e.g., for performing a setup procedure).

The A/V device 210 may include, in some implementations, a power control module 438. The power control module 438 may include any combination of hardware and/or software elements to activate and/or disable hardware components and/or software routines. The power control module 438 may encode one or more power operation modes, such as a "normal" mode and a reduced power mode. Embodiments of the present disclosure may leverage the power control module 438 to cause the A/V device to enter into a particular power state.

Figure 5:
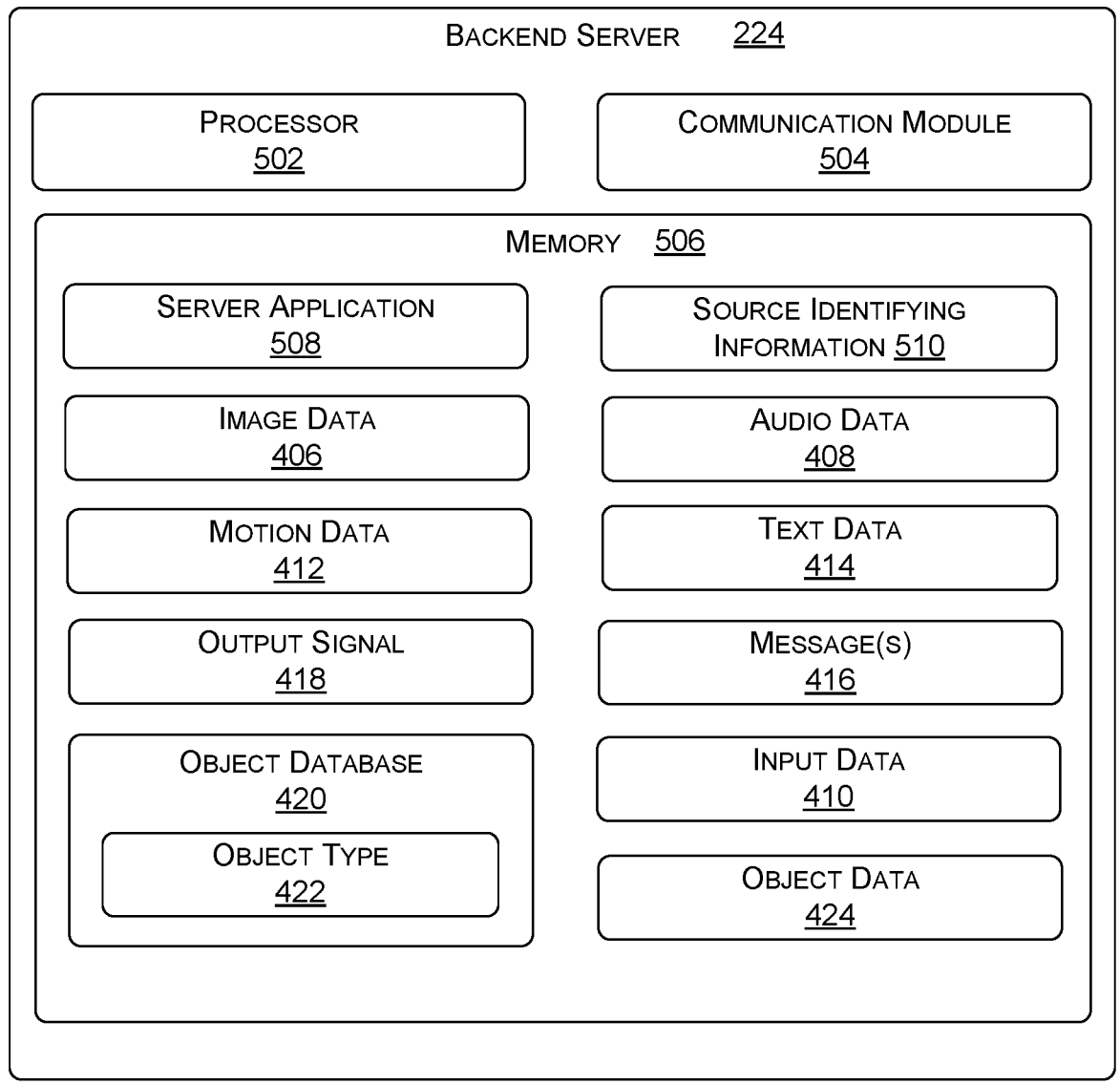
FIG. 5 is a functional block diagram illustrating one example embodiment of a backend device according to various aspects of the present disclosure.

FIG. 5 is a functional block diagram illustrating one embodiment of the backend server 224 according to various aspects of the present disclosure. The backend server 224 may comprise processor(s) 502 (which may be similar to, and/or include similar functionality as, the processor(s) 310), a communication module 504 (which may be similar to, and/or include similar functionality as, the communication module 312), and a memory 506 (which may be similar to, and/or include similar functionality as, the memory 402). The communication module 504 may allow the backend server 224 to access and communicate with devices connected to the network (Internet/PSTN) 212 (e.g., the A/V device 210, the hub device 202, the client devices 214, 216, a device controlled by the security monitoring service 228, the A/V devices 230, and/or the client devices 232).

The memory 402 may include a server application 508 that configures the processor(s) 502 to receive and/or retrieve the audio data 408, the text data 414, the input data 410, the messages 416, the image data 406, and/or the motion data 412 from the A/V device 210 (e.g., in the output signal 418) and/or the hub device 202. The server application 508 may also configure the processor(s) 502 to transmit (and/or forward) the audio data 408, the text data 414, the input data 410, the messages 416, the image data 406, and/or the motion data 412 to the client devices 214, 216 using the communication module 504. Furthermore, the server application 508 may configure the processor(s) 502 to receive, using the communication module 504, image data 512 (also referred to as "second image data 512") generated by the A/V devices 230.

Although referred to as the backend server 224 with reference to the processes described herein, the backend server 224 may additionally, or alternatively, include one or more of the devices from the network(s) of servers/backend devices 220. For example, the processes described herein with respect to the backend server 224 may additionally, or alternatively, at least in part, be performed by one or more backend APIs 226.

In further reference to FIG. 5, the memory 506 may also include source identifying data 510 that may be used to identify the A/V device 210, the hub device 202, and/or the client devices 214, 216. In addition, the source identifying data 510 may be used by the processor(s) 502 of the backend server 224 to determine the client devices 214, 216 are associated with the A/V device 210 and/or the hub device 202.

In some embodiments, the server application 508 may further configure the processor(s) 502 to generate and transmit a report signal (not shown) to a third-party client device (e.g., electronic device(s) 234), which may be associated with a law enforcement agency or the security monitoring service 228, for example. The report signal, which may be the message 416, in some examples, may include the image data 406, the audio data 408, the text data 414, and/or the second image data 512.

As described herein, at least some of the processes of the A/V device 210, the hub device 202, and/or the client device 214, 216 may be executed by the backend server 224.

The hub device 202 and/or the backend server 224 (and/or one or more additional or alternative components of the network(s) of servers/backend devices 220) may alternatively be referred to herein as "network devices."

Figure 6:
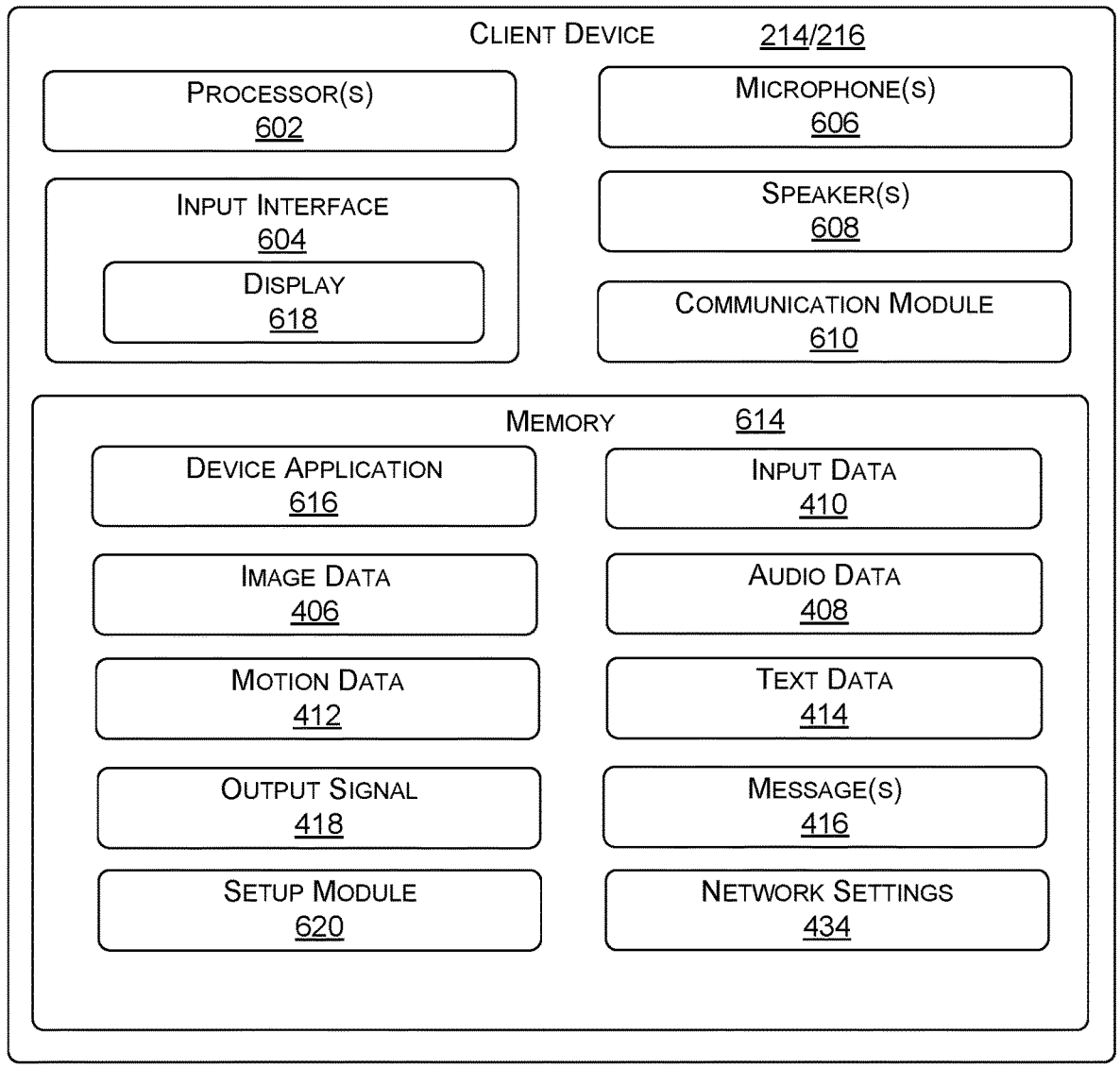
FIG. 6 is a functional block diagram illustrating one example embodiment of a client device according to various aspects of the present disclosure.

Now referring to FIG. 6, FIG. 6 is a functional block diagram illustrating one embodiment of the client device 214, 216, according to various aspects of the present disclosure. The client device 214, 216 may comprise processor(s) 602 (which may be similar to, and/or include similar functionality as, the processor(s) 310) that are operatively connected to an input interface 604, microphone(s) 606, speaker(s) 608, a communication module 610 (which may be similar to, and/or include similar functionality as, the communication module 312), and memory 612 (which may be similar to, and/or include similar functionality as, the memory 402). The client device 214, 216 may further comprise a camera (not shown) operatively connected to the processor(s) 602.

The memory 612 may store a device application 616. In various embodiments, the device application 614 may configure the processor(s) 602 to receive input(s) to the input interface 604 (e.g., user input into a keyboard indicative of network credentials, for subsequent transmission as setup instructions to an A/V device). In addition, the device application 616 may configure the processor(s) 602 to receive, using the communication module 610, the input data 410, the image data 406, the audio data 408, the output signal 418, and/or messages 416 from one or more of the A/V device 210, the hub device 202, or the backend server 224.

With further reference to FIG. 6, the input interface 604 may include a display 618. The display 618 may include a touchscreen, such that the user of the client device 214, 216 may provide inputs directly to the display 618 (e.g., user input into a virtual keyboard indicative of network credentials, for subsequent transmission as setup instructions to an A/V device). In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 614 may configure the processor(s) 602 to cause the display 618 to display the message 416. The message 416 may indicate that the A/V device 210 detected motion, detected the presence of an object, received an input (e.g., to the button 306), etc. While displaying the message 416, the input interface 604 may receive input from the user to answer the message 416. In response, the device application 614 may configure the processor(s) 602 to display the received image data 406 on the display 618 (e.g., display image(s) and/or video footage represented by the image data 406).

As described herein, at least some of the processes of the A/V device 210, the hub device 202, and/or the backend server 224 may be executed by the client device 214, 216.

The client device 214, 216 includes network settings 434, which may be similar to or the same as the network settings 434 described above with respect to FIG. 4. The network settings 434 may include network credentials for a WLAN in a user's home, workplace, or other premises. The network settings 434 may be transmitted by the client device 214, 216 to an A/V device during a setup procedure as setup instructions, to thereby enable the A/V device to connect to the network associated with the network settings 434.

The client device 214, 216 may include a setup module 620 to facilitate aspects of a setup procedure for an A/V device in a setup mode. The setup module 620 may form a part of the device application 616, or may be its own standalone application. The setup module 620 may include a graphical user interface (GUI) elements to guide a user through the setup procedure for an A/V device. For example, the setup module 620 may display a series of input elements (e.g., text boxes, drop-down menus, etc.) into which a user can enter information to be encoded as setup instructions for an A/V device, such as network credentials (the same as or different from the network settings 434), a device name or nickname, account information associated with the A/V device, etc. The setup module 620 may also facilitate establishing the direct wireless connection between the client device 214, 216 and an A/V device in setup mode that is broadcasting a wireless network.

In some embodiments, the setup module 620 may also control one or more elements of the client device 214, 216 to produce a sequence of images, sounds, light, and/or other physical phenomena that can be detected by an A/V device as a gesture. For instance, as described above, the setup module 620 may generate a sequence of sounds that represent an audio gesture that induces a A/V device to enter into a setup mode. The setup module 620 may encode instructions for causing the client device 214, 216 to produce these types of touchless triggers that, if detected by an A/V device with a gesture recognition module 430, causes the A/V device to enter a setup mode.

Figure 7:
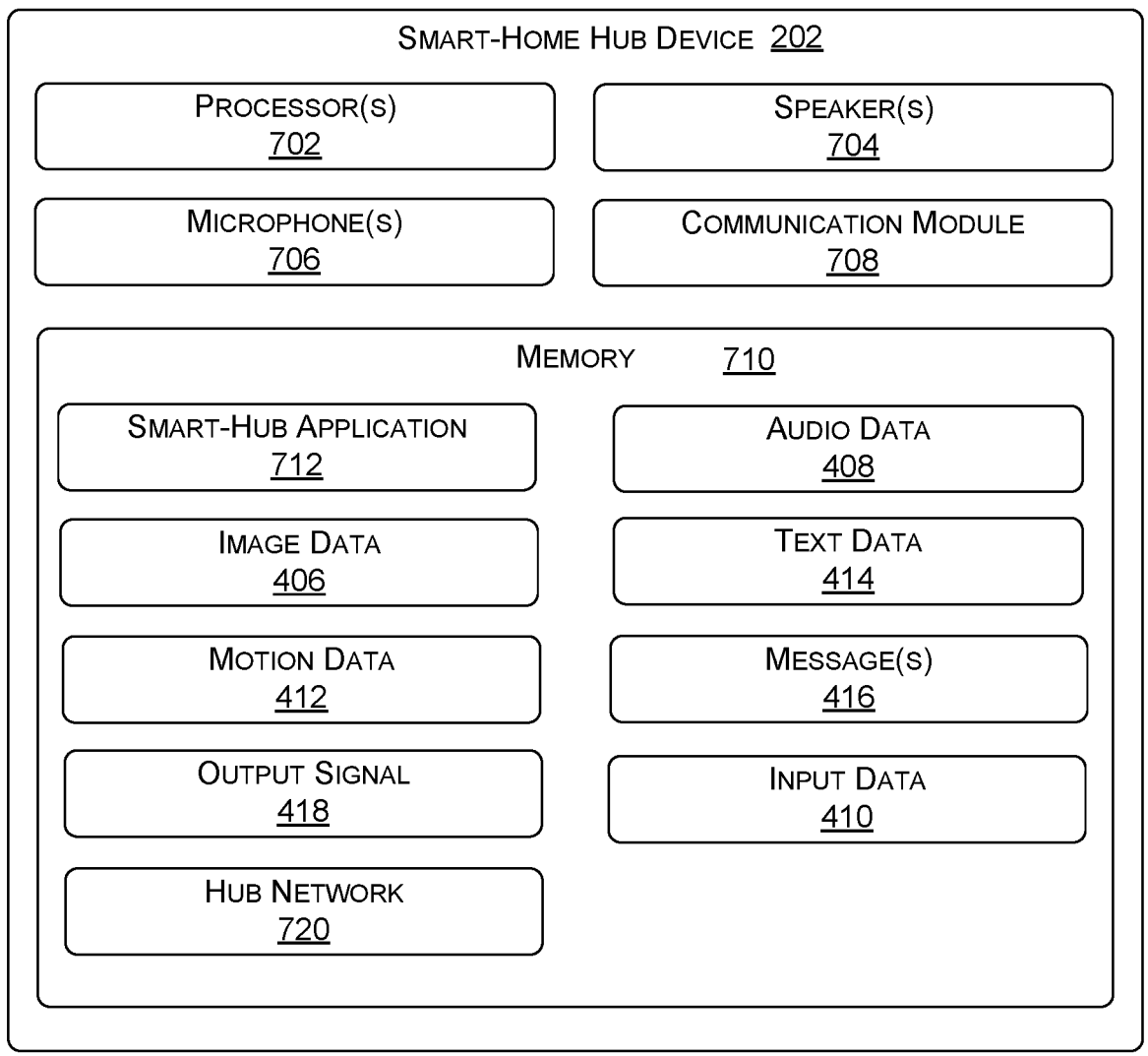
FIG. 7 is a functional block diagram illustrating one example embodiment of a smart-home hub device according to various aspects of the present disclosure.

FIG. 7 is a functional block diagram illustrating an embodiment of the smart-home hub device 202 (alternatively referred to herein as the "hub device 202") according to various aspects of the present disclosure. The hub device 202 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. The hub device 202 may comprise processor(s) 702 (which may be similar to, and/or include similar functionality as, the processor(s) 310) that are operatively connected to speaker(s) 704, microphone(s) 706, a communication module 708 (which may be similar to, and/or include similar functionality as, the communication module 310), and memory 710 (which may be similar to, and/or include similar functionality as, the memory 402). In some embodiments, the hub device 202 may further comprise one or more of a camera (not shown). In some embodiments, the hub device 202 may not include one or more of the components shown in FIG. 7, such as the speaker(s) 704 and/or the microphone(s) 706.

As shown in the example of FIG. 7, the memory 710 stores a smart-home hub application 712. In various embodiments, the smart-home hub application 712 may configure the processor(s) 702 to receive sensor data from the sensors 204 and/or the automation devices 206. For example, the sensor data may include a current state (e.g., opened/closed for door and window sensors, motion detected for motion sensors, living room lights on/off for a lighting automation system, etc.) of each of the sensors 204 and/or the automation devices 206. In some of the present embodiments, the sensor data may be received in response to sensor triggers. The sensor triggers may be a door opening/closing, a window opening/closing, lights being turned on/off, blinds being opened/closed, etc. As such, the sensor data may include the current state of the sensors 204 and/or the automation devices 206 as well as any updates to the current state based on sensor triggers.

With further reference to FIG. 7, the smart-home hub application 712 may configure the processor(s) 702 to receive the audio data 408, the text data 414, the image data 406, the motion data 412, the input data 410, and/or the messages 416 from the A/V device 210 (in some embodiments, via the backend server 224) using the communication module 708. For example, the hub device 202 may receive and/or retrieve (e.g., after receiving a signal from the A/V device 210 that the A/V device 210 has been activated) the image data 406, the input data 410, and/or the motion data 412 from the A/V device 210 and/or the backend server 224 in response to motion being detected by the A/V device 210. The smart-hub application 712 may then configure the processor(s) 702 to transmit, using the communication module 708, the audio data 408, the text data 414, the image data 406, the motion data 412, the input data 410, and/or the messages 416 to the client device 214, 216, the backend server 224, and/or an additional electronic device (e.g., a second A/V device 210, the automation device(s) 206, the sensor(s) 204, etc.).

As described herein, at least some of the processes of the A/V device 210, the backend server 224, and/or the client device 214, 216 may be executed by the hub device 202.

The hub device 202 may include, in some implementations, a hub network 720. The hub network 720 may be a wireless network broadcast by a wireless AP, in some embodiments. Alternatively, and/or additionally, the hub network 720 may be a personal area network (PAN), such as Bluetooth, Zigbee®, Z-Wave, and/or any other communication protocol. In some instances, configuring an A/V device using a setup procedure to connect to a network may involve providing to the A/V device network credentials for connecting to the hub network 720.

Each of the processes described herein, including the processes 800, 900, 1000, 1100, and 1200, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 8:
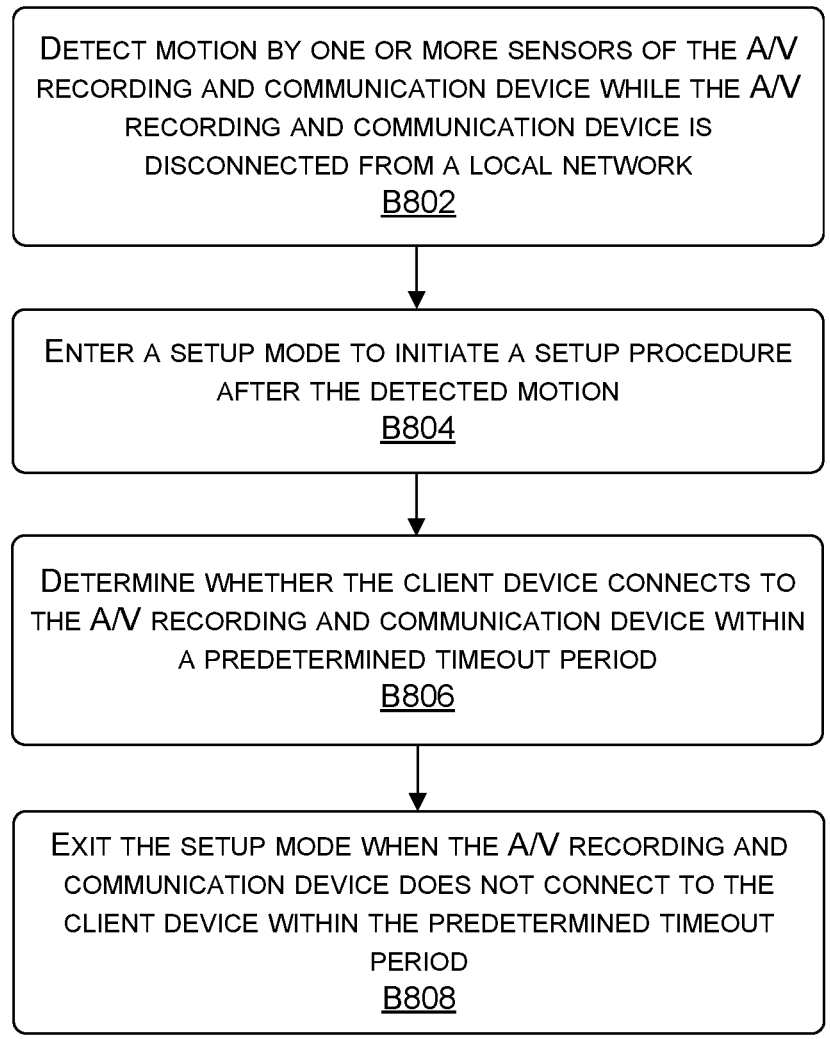
FIG. 8 is a flowchart illustrating an example process for causing an A/V recording and communication device to enter a setup mode, according to various aspects of the present disclosure.

FIG. 8 is a flowchart illustrating an example process 800 for operating an A/V recording and communication device, according to various aspects of the present disclosure. The A/V recording and communication device ("A/V device")

210 (FIG. 4) may perform one or more aspects of the process 800. The A/V device 210, at block B802, detects motion by one or more sensors of the A/V device while the A/V device is disconnected from a local network. For example, the A/V device 210 may be connected to a WLAN, such as the user's network 218 (FIG. 2), at a first time, and at a second time subsequent to the first time the A/V device 210 is no longer connected to the WLAN. The A/V device 210 may then use the motion sensor(s) 326 (e.g., PIR sensors) to detect movement of infrared radiation sources (e.g., human beings). Alternatively, or additionally, the A/V device 210 may include an image sensor or camera 314 that captures two or more images, and identifies motion based on an object moving within a field-of-view of the camera 314. The detected motion may be any type of motion, or a specific gesture (e.g., a particular sequence of movements), as described in more detail above. The motion may simply be a "nave" detection (e.g., detecting motion but not any properties thereof), or may be a sequence of motions that collectively comprise a gesture. Detecting motion may involve capturing signals by one or more sensors of the A/V device 210, and processing those signals to measure or characterize the nature of those signals (e.g., the direction of motion, the translation and/or rotation of an object, etc.). At block B802, "detecting" motion may refer to determining that any motion-based or gesture-based triggering event, such as a gesture, has occurred.

The A/V device 210, at block B804, enters a setup mode to initiate a setup procedure after the detected motion. For example, the A/V device, responsive to the detected motion or recognized gesture, may disable one or more subsystems and/or enable one or more subsystems when entering the setup mode. In some embodiments, the A/V device 210 may activate a WAP and begin broadcasting a wireless network, to allow a client device 214, 216 (or some other computing device) to establish a direct wireless connection to the A/V device 210. The A/V device 210 may persist in the setup mode for a predetermined duration of time (e.g., a two-minute timeout period), and might automatically exit the setup mode unless a device establishes a direct wireless connection to the A/V device 210 within that predetermined time period.

The A/V device 210, at block B806, determines whether the client device connects to the A/V device within a predetermined timeout period. In various embodiments, the length of the timeout period may be 10 seconds, or 15 seconds, or 20 seconds, or 30 seconds, or 60 seconds, or 2 minutes, or 3 minutes, or 5 minutes, or any other length of time. If the client device 214, 216 establishes a wireless connection, or attempts to establish a wireless connection, during the timeout period, the expiration timer or timeout period may be ignored or extended. However, if neither the client device 214, 216, nor any other computing device, establishes or attempts to establish a wireless connection with the A/V device 210 during the timeout period, the A/V device 210 may determine that a client device has not connected to the A/V device within the timeout period and exit the setup mode at or after the expiration of that timeout period.

In some implementations, the establishing of a wireless connection between the A/V device 210 and the client device 214, 216 may initiate a second timeout period, which may be different from the initial or first timeout period. If the client device 214, 216 does not transmit setup instructions during this second timeout period (e.g., the user of the client device 214, 216 does not step through the setup procedure), the A/V device 210 may, in some cases, automatically exit the setup mode at or after the expiration of the second timeout period. In various embodiments, the length of the second timeout period may be 60 seconds, or 2 minutes, or 3 minutes, or 5 minutes, or 10 minutes, or any other length of time.

The A/V device 210, at block B808, exits the setup mode when the A/V device does not connect to the client device within the predetermined timeout period. Exiting the setup mode may involve transitioning the A/V device 210 into a different mode, such as a normal operation mode or a reduced power mode, among other possible operation modes. If the A/V device 210 does connect to the client device 214, 216 within the predetermined timeout period, however, the A/V device 210 and/or the client device 214, 216 may begin performing a setup procedure, as will be described below with respect to FIG. 9.

Figure 9:
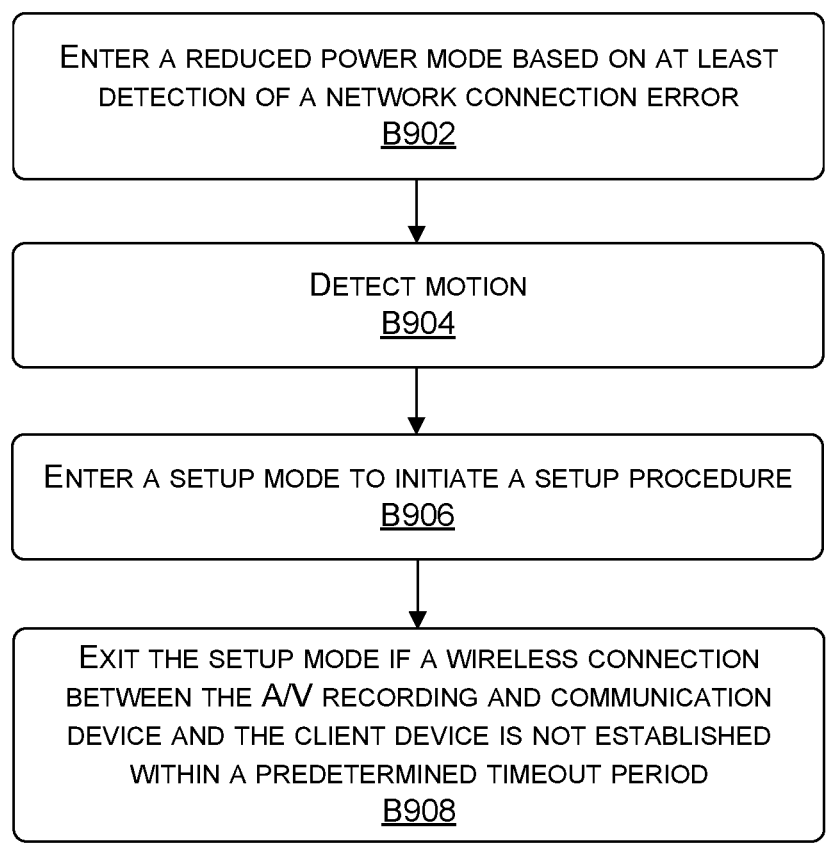
FIG. 9 is a flowchart illustrating an example process for automatically entering a setup mode for an A/V recording and communication device, according to various aspects of the present disclosure.

FIG. 9 is a flowchart illustrating an example process 900 for automatically entering a setup mode for an A/V device, according to various aspects of the present disclosure. The A/V device 210 ("FIG. 4") may perform one or more aspects of the process 900. The A/V device 210, at block B902, enters a reduced power mode based on at least detection of a network connection error. A network connection error may occur if the A/V device 210 is unable to establish or maintain a wireless connection with a wireless network or router, or if the A/V device 210 does not have network credentials with which to attempt to establish a wireless connection, for example. In some circumstances, a network connection error may arise if the network credentials for a WLAN are changed (e.g., the password for a user's home network is changed), such that the stored network settings 434 on the A/V device 210 can no longer be used to connect to the specified network, for example.

The reduced power mode may involve deviating from or altering the normal, full-power operation of the A/V device 210 in order to conserve power, as described above in greater detail. In this example, the reduced power mode may still provide power to and operate a camera 314 and/or motion sensors 326 of the A/V device 210, such that the camera 314 and/or motion sensors 326 continue to capture data and analyze that data to detect motion and/or gestures.

The A/V device 210, at block B904, detects motion. The motion may simply be a "naïve" detection (e.g., detecting motion but not any properties thereof), or may be a sequence of motions that collectively comprise a gesture. Detecting motion may involve capturing signals by one or more sensors of the A/V device 210, and processing those signals to measure or characterize the nature of those signals (e.g., the direction of motion, the translation and/or rotation of an object, etc.). At block B904, "detecting" motion may refer to determining that any motion-based or gesture-based triggering event, such as a gesture, has occurred.

The A/V device 210, at block B906, enters a setup mode to initiate a setup procedure. The setup mode and setup procedure are described in greater detail herein. In this example, entering a setup mode includes the A/V device 210 broadcasting a wireless network, such as Wi-Fi, Bluetooth, or another wireless communication protocol.

The A/V device 210, at block B908, exits the setup mode when a wireless connection between the A/V device and the client device is not established within a predetermined timeout period. Exiting the setup mode may involve transitioning the A/V device 210 into a different mode, such as a normal operation mode or a reduced power mode, among other possible operation modes. In this example, the A/V device 210 may transition back into the reduced power mode.

Figure 10:
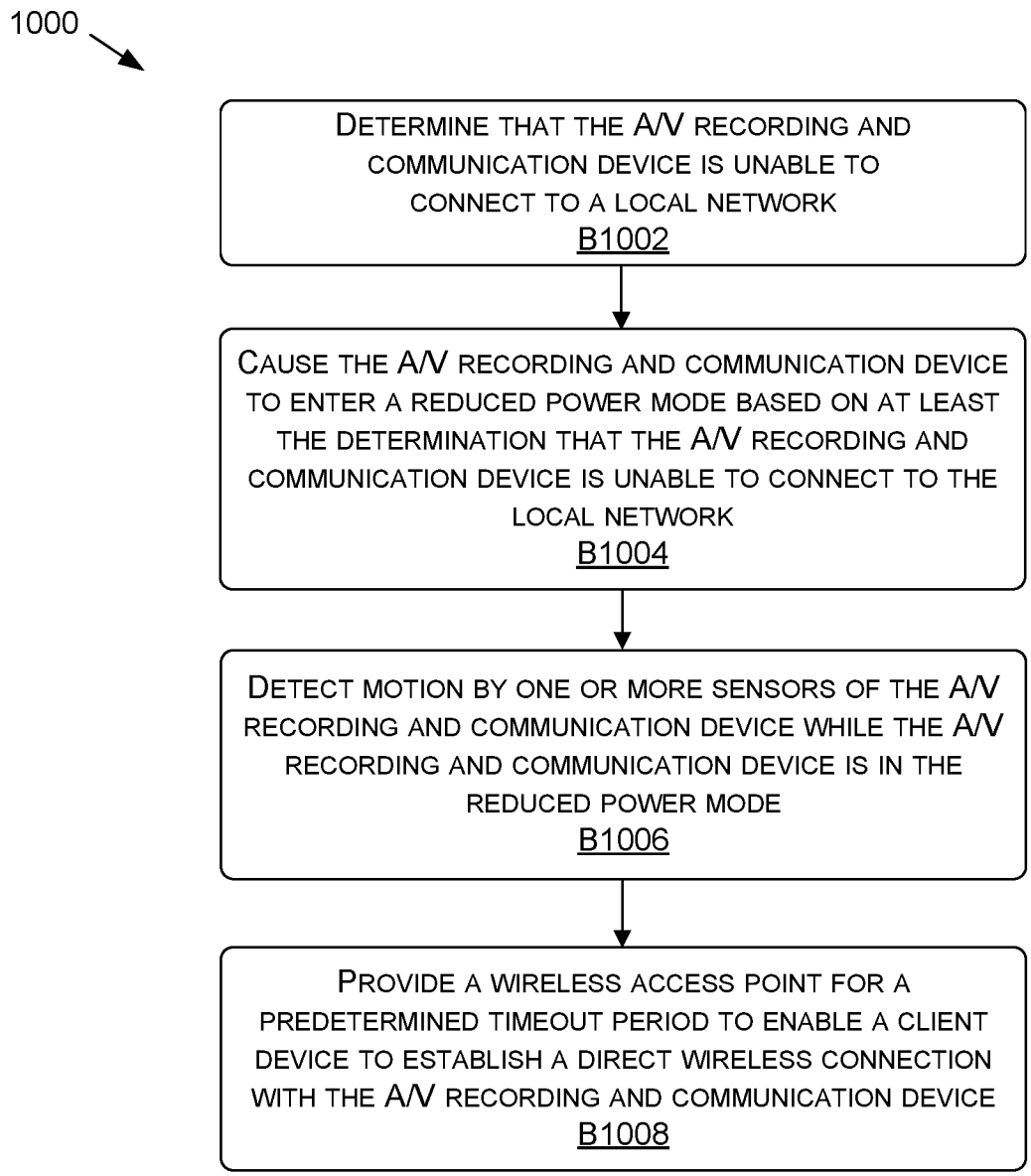
FIG. 10 is a flowchart illustrating another example process for causing an A/V recording and communication device to enter a setup mode, according to various aspects of the present disclosure.

FIG. 10 is a flowchart illustrating another example process 1000 for causing an A/V device to enter a setup mode, according to various aspects of the present disclosure. The A/V device 210 ("FIG. 4") may perform one or more aspects of the process 1000. The A/V device 210, at block B1002, determines that the A/V device is unable to connect to a local network. For example, the A/V device 210 may become disconnected from the local network upon the network credentials for the local network being changed. Alternatively, and/or additionally, the A/V device 210 may not be configured to connect to the local network (e.g., first-time setup, or moving the A/V device 210 to a new location with a different network). Regardless of the circumstance giving rise to the A/V device's 210 inability to connect to the local network, the A/V device may determine that it cannot connect to the local network (or that it's not configured to connect to any network).

The A/V device 210, at block B1004, enters a reduced power mode based on at least the determination that the A/V device is unable to connect to the local network. The reduced power mode may be similar to the reduced power mode described above in more detail.

The A/V device 210, at block B1006, detects motion by one or more sensors of the A/V device while the A/V device is in the reduced power mode. The one or more sensors may include motion sensors, image sensors, microphones, and/or other sensing devices. In this example, the motion may simply be a "naive" detection (e.g., detecting motion but not any properties thereof), or may be a sequence of motions that collectively comprise a gesture. Detecting motion may involve capturing signals by one or more sensors of the A/V device 210, and processing those signals to measure or characterize the nature of those signals (e.g., the direction of motion, the translation and/or rotation of an object, etc.). At block B1006, "detecting" motion may refer to determining that any motion-based or gesture-based triggering event, such as a gesture, has occurred.

The A/V device 210, at block B1008, provides a wireless access point for a predetermined timeout period to enable the client device to establish a direct wireless connection with the A/V device. The A/V device 210 may include hardware and/or software to enable the A/V device 210 to act as a WAP. The WAP 436 of the A/V device 210 may be enabled and/or disabled in software, to permit the A/V device 210 to temporarily broadcast a wireless network for setup purposes. If a wireless connection between the A/V device and the client device is not established within the predetermined timeout period, the A/V device 210 may cease providing the wireless access point.

Figure 11:
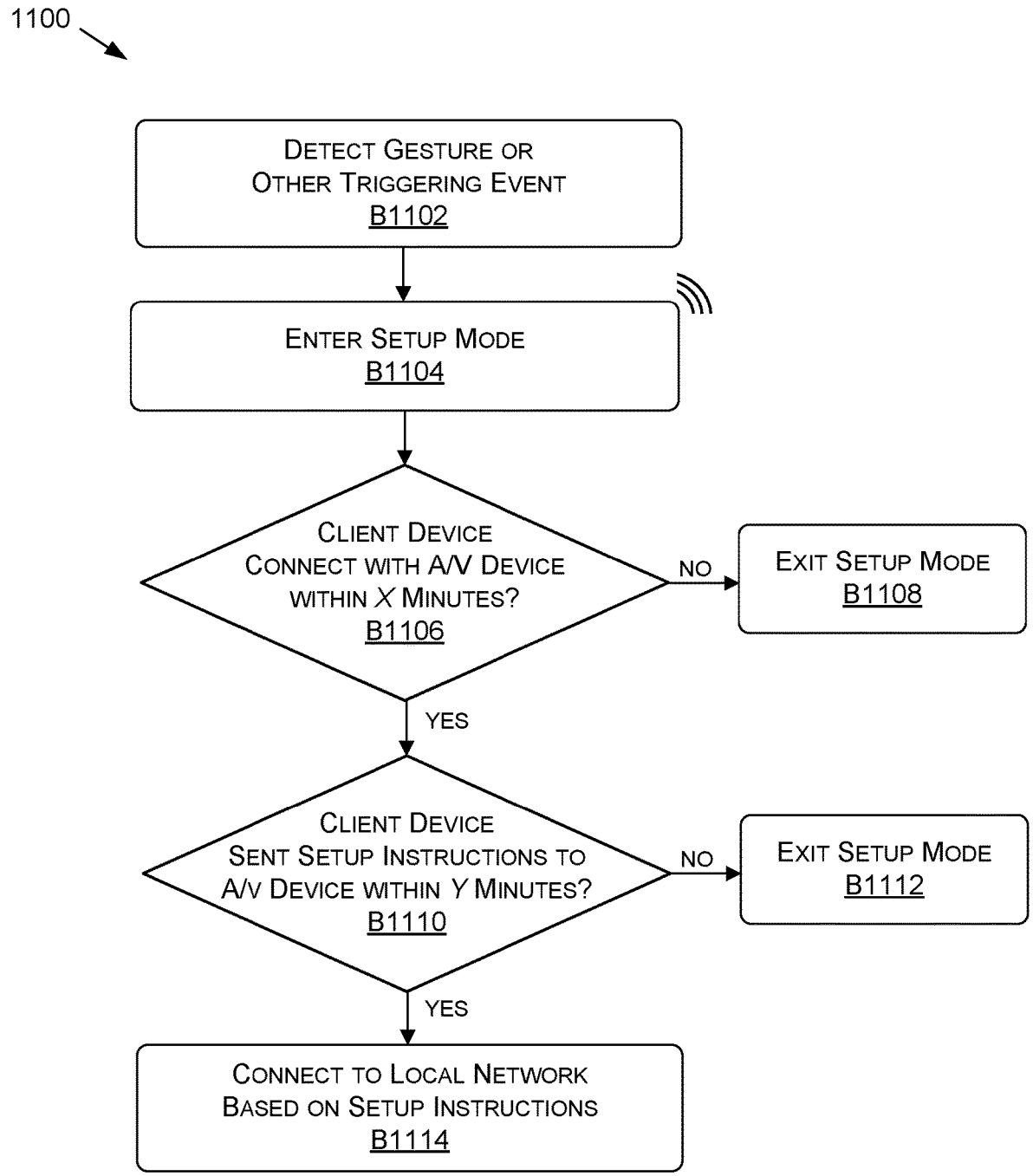
FIG. 11 is a flowchart illustrating an example process for connecting an A/V device to a local network, according to various aspects of the present disclosure.

FIG. 11 is a flowchart illustrating an example process 1100 for connecting an A/V device to a local network, according to various aspects of the present disclosure. In this example process 1100, the A/V device may be similar to or the same as the A/V device 210 described above with respect to FIG. 4.

The A/V device, at block B1102, detects a gesture or other triggering event, such as motion, a sound, or sequence of movements or sounds. Detecting such a gesture or triggering event may involve processing by the gesture recognition module 430 and/or the touchless trigger detection module 432, among other components of the A/V device 210. The motion may simply be a "naïve" detection (e.g., detecting motion but not any properties thereof), or may be a sequence of motions that collectively comprise a gesture. Detecting motion may involve capturing signals by one or more sensors of the A/V device 210, and processing those signals to measure or characterize the nature of those signals (e.g., the direction of motion, the translation and/or rotation of an object, etc.). At block B1102, "detecting" motion may refer to determining that any motion-based or gesture-based triggering event, such as a gesture, has occurred.

In response to detecting the gesture or other triggering event, the A/V device, at block B1104, enters a setup mode. In the setup mode, the A/V device may begin broadcasting a wireless network. The A/V device may set a first timeout period of X minutes, during which the A/V device broadcasts the wireless network and awaits a connection request from a client device or other computing device, as indicated by block B1106. If no client device attempts to connect to the A/V device during the X-minute period—that is, if the A/V device does not receive a request or instruction from a client device to connect to the A/V device during the X-minute period—the A/V device exits setup mode at block B1108 and the process 1100 ends.

However, if a client device does connect to the A/V device's wireless network during the X-minute timeout period, the process 1100 proceeds to block B1110. There, the A/V device determines whether the connected client device has sent setup instructions to it within a Y-minute timeout period. In various embodiments, the values of X and Y may be the same or different. Example lengths of time for the first and second timeout periods are provided above at the description of FIG. 8. The client device may guide a user through a setup procedure, allowing the user to specify settings and other configuration information, such as network credentials for the A/V device. After completing the setup procedure on the client device, the client device may transmit, and the A/V device 210 may receive, that information as "setup instructions," instructing the A/V device to configure itself in accordance with the received information. However, if the A/V device 210 does not receive setup instructions during the Y-minute timeout period, the process 1100 proceeds to block B1112, and the A/V device exits the setup mode.

If the client device does send, and the A/V device 210 does receive, setup instructions during the Y-minute timeout period, then the process 1100 proceeds to block B1114, where the A/V device connects to a local network associated with the network credentials or settings received within the setup instructions. In some instances, block B1114 occurs as a part of a "setup mode," where the A/V device attempts to establish the wireless connection with the local network. If the received network credentials are invalid, however, the A/V device may stay in the setup mode. In some embodiments, the A/V device 210 may transmit a notification to the client device that the network credentials were invalid. Alternatively, the client device may independently determine—based on the A/V device persisting in setup mode and/or not connecting to the local network—that the network credentials provided by the user were incorrect. However, in some implementations, block B1114 may involve exiting setup mode and proceeding to attempt to establish the connection with the local network.

In some embodiments, connecting to a local network based on setup instructions is performed by the A/V device 210 as a part of the setup mode. In other embodiments, connecting to a local network based on setup instructions is performed by the A/V device 210 after exiting the setup mode. "Setup mode" may involve a setup procedure that involves connecting to a local network. The scope of the "setup mode," and the operations performed by the A/V device 210 and/or the client device 214, 216 while the A/V device 210 is in setup mode, may vary depending on the particular implementation.

Figure 12:
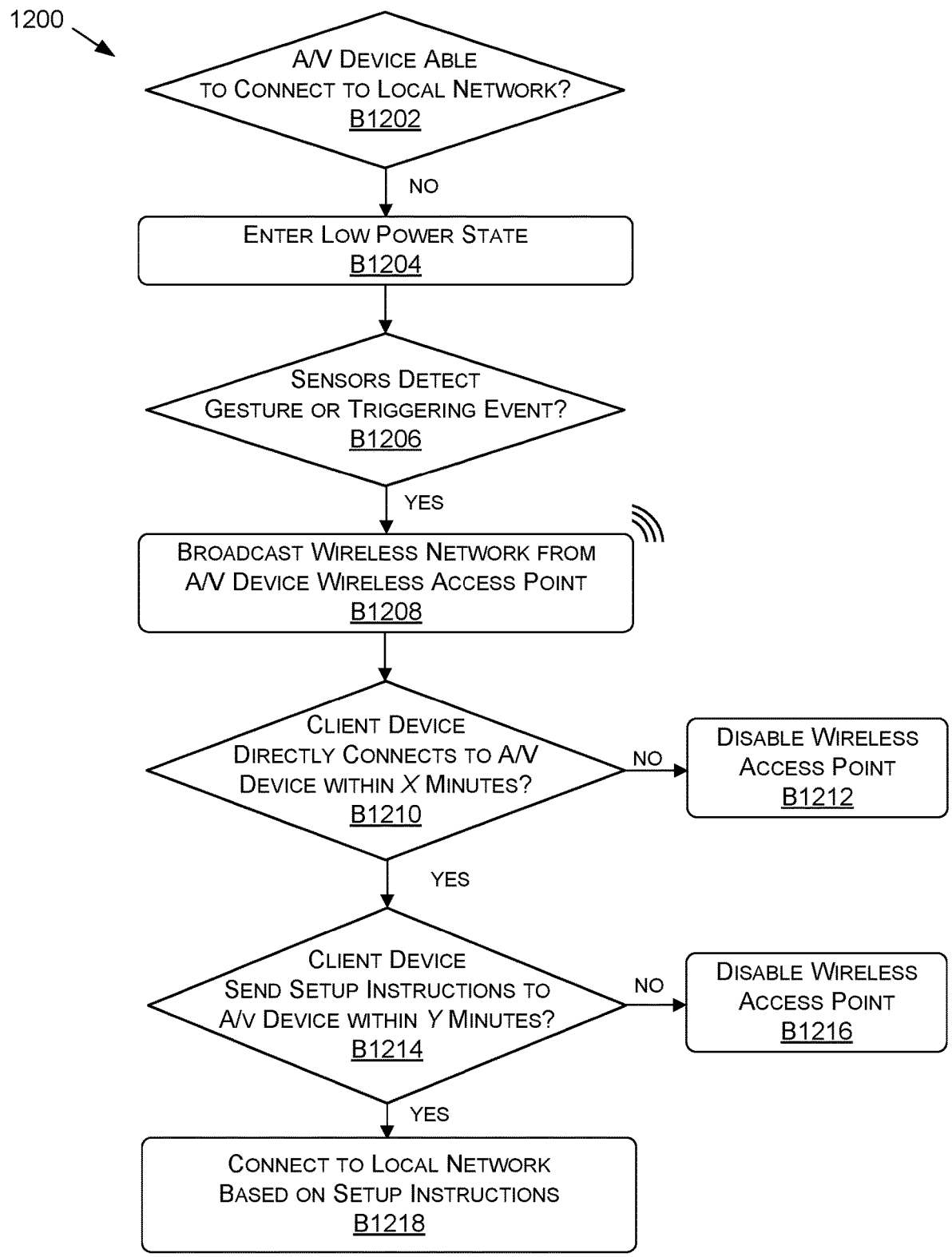
FIG. 12 is a flowchart illustrating an example process for an A/V device that is disconnected from a local network, according to various aspects of the present disclosure.

FIG. 12 is a flowchart illustrating an example process 1200 for operating an A/V device that is disconnected from a local network, according to various aspects of the present disclosure. In this example process 1200, the A/V device may be similar to or the same as the A/V device 210 described above with respect to FIG. 4.

The A/V device, at block B1202, determines whether it is able to connect to a local network. Block B1202 may involve determining that no network credentials are stored on the A/V device, or that existing network credentials are invalid. If the A/V device is able to connect to the local network, the A/V device may connect to the local network and the process 1200 may end (not shown). However, if the A/V device is unable to connect to the local network, the A/V device then enters a low-power state or mode at block B1204. While in low-power mode, sensors of the A/V device may poll or otherwise be set to detect gestures, motion, or other triggering events at block B1206. If no such a gesture, motion, or triggering event is detected by the A/V device, the A/V device may remain in the low-power state or mode. However, if such a gesture, motion, or triggering event is detected by the A/V device, the process 1200 proceeds to block B1208, and the A/V device begins broadcasting a wireless network via a wireless access point of the A/V device.

While broadcasting the wireless network, the A/V device determines whether a client device or other computing device directly connects with the A/V device during a timeout period of X minutes. If no device establishes that direct connection during the X-minute timeout period, the A/V device disables the WAP at block B1212 and the process 1200 ends.

However, if a client device does establish a direct wireless connection with the A/V device within the X-minute timeout period, the process 1200 proceeds to block B1214, and the A/V device determines whether the client device has sent setup instructions to the A/V device during a Y-minute timeout period. The Y-minute timeout period may begin on or after the time when the client device establishes the direct wireless connection with the A/V device. If, by the end of the Y-minute timeout period, the A/V device does not receive setup instructions from the directly connected client device, then the A/V device disables the WAP at block B1216 and the process 1200 ends.

However, if the A/V device does receive setup instructions form the client device prior to the expiration of the Y-minute timeout period, the A/V device proceeds to block B1218 and connects to the local network associated with the network credentials stored in the received setup instructions. Block B1218 may involve the A/V device exiting the low-power state and transitioning to a normal operation mode. In various embodiments, the values of X and Y may be the same or different. Example lengths of time for the first and second timeout periods are provided above at the description of FIG. 8.

Figure 13:
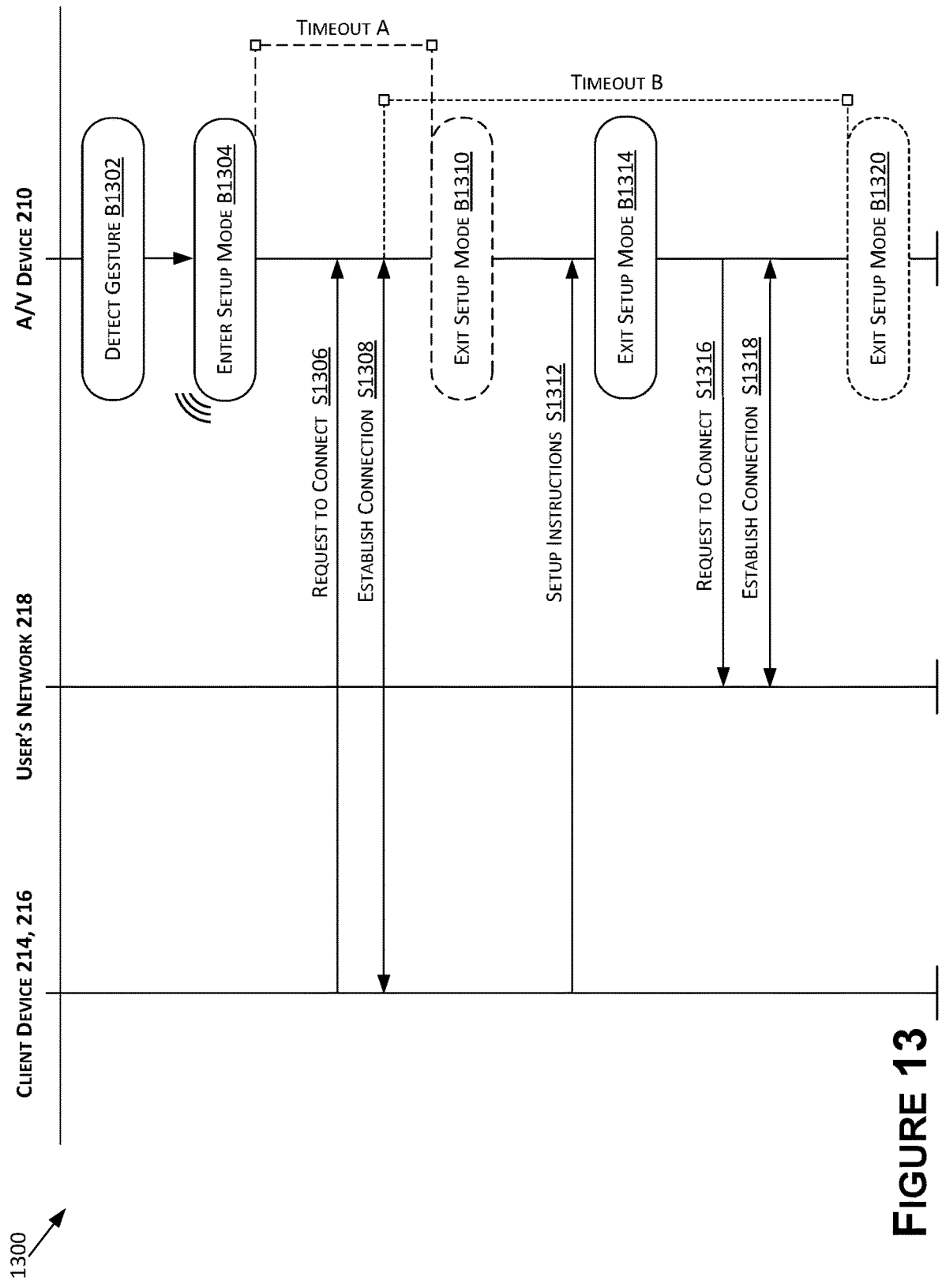
FIG. 13 is a sequence diagram of a process for connecting an A/V recording and communication device to a user's network, according to various aspects of the present disclosure.

FIG. 13 is a sequence diagram of a process 1300 for connecting an A/V recording and communication device ("A/V device") to a user's network, according to various aspects of the present disclosure. The process 1300 may involve actions performed by and/or information transferred between or among the client device 214, 216, the A/V device 210, and/or the user's network 218. The user's network 218 may be a WLAN produced by a router within the user's home, workplace, or other premises. Alternatively, or additionally, the user's network 218 may be a personal area network provided by a hub device, such as the hub network 720.

FIG. 13 illustrates an example of the initiation and termination of a setup mode for the A/V device. To aid in this explanation, the sequence diagram includes dashed-line blocks to denote possible outcomes, similar to the diamond-shaped decision blocks shown in the flowcharts of FIGS. 11 and 12. A dashed-line block refers to a conditional action that may or may not be performed, depending on whether or not the condition has been satisfied.

The A/V device 210, at block B1302, detects the occurrence of a gesture or other triggering event. Thereafter and/or in response, the A/V device 210 enters a setup mode at block B1304. The setup mode may involve the A/V device 210 broadcasting a wireless network. As described above, the A/V device 210 may be configured to persist in the setup mode for a predetermined timeout period, as denoted by "Timeout A" in FIG. 13. If no wireless connections are established with the client device 214, 216 or another computing device during the Timeout A period, the A/V device exits the setup mode at block B1310.

However, in this example, the client device 214, 216 requests to connect to the A/V device's 210 broadcast wireless network prior to the expiration of the Timeout A period at signal S1306. Then, at signal S1308, the A/V device 210 and the client device 214, 216 establish a direct wireless connection with each other. At this moment, or soon thereafter, a new "Timeout B" period begins. At either the moment of signal S1306, signal S1308, or some time proximate to the occurrence of signals S1306 or S1308, the Timeout A period is canceled or otherwise ignored, such that block B1310 will no longer be performed by the A/V device 210 at the expiration of the Timeout A period. The A/V device 210 may be configured to continue persisting in the setup mode until the expiration of the Timeout B period, or until setup instructions are received from the client device 214, 216—whichever occurs earlier. If the A/V device 210 receives no setup instructions, then, at expiration of the Timeout B period, the A/V device 210 automatically exits the setup mode at block B1320.

However, in this example, the client device 214, 216 transmits, and the A/V device 210 receives, setup instructions at signal S1312, which occurs before the expiration of the Timeout B period. The setup instructions include network credentials for the user's network 218. After receiving the setup instructions from the client device 214, 216, the A/V device 210 may disconnect from the client device 214, 216, stop broadcasting a wireless network of its own, and exit the setup mode at block B1314. The A/V device 210 performing block B1314 may in turn cause the A/V device 210 to cancel or ignore the Timeout B period and cancel the scheduled performance of block B1320.

Then, the A/V device may request to connect to the user's network 218 at signal S1316, using the network credentials received from the setup instructions. If the network credentials are correct, the user's network 218 may accept the request and establish a wireless connection with the A/V device 210 at signal S1318.

The configuration or reconfiguration of networked devices can be difficult, particularly when those devices are mounted or otherwise situated in hard-to-reach locations. While many networked devices have a "reset" button that causes the device to transition into a setup mode, accessing that button can be inconvenient depending on where the networked device is located.

Some networked devices, including outdoor security devices, may be intentionally placed in out-of-reach locations to reduce the possibility of theft and/or to provide a greater field-of-view for the security device's camera or other sensors. Those security devices may connect to a wireless network of a user's home, workplace, or other premises. However, changes in the network (e.g., new SSID, new password, change in security protocol, change in frequency band, etc.) can cause a networked device to become disconnected from the network, and its stored network credentials no longer applicable. Unmounting those devices to access reset buttons or other physical reset means may be difficult for a user. This problem is compounded if the user has multiple hard-to-reach security devices placed in different locations.

Techniques of the present application allow these devices to detect motion, sounds, gestures, and/or other touchless triggers to cause a networked device to enter into a setup mode, without the need for physically accessing a button or other element of the networked device. To mitigate against accidental setup mode triggering or possible false detections, embodiments of the present disclosure include timeouts that cause the networked device to terminate the setup mode or procedure after a period of inactivity. While in the setup mode, a user may directly connect to a WAP of the networked device using a client device or other computing device. The user's client device or computing device may guide the user through a setup process, allowing the user to configure the networked device, select a local network for the network device to connect to, and provide network credentials for that local network—all of which are transmitted to the networked device as setup instructions. The networked device may use the newly-received network credentials to establish, or re-establish, a connection with the local network.

Figure 14:
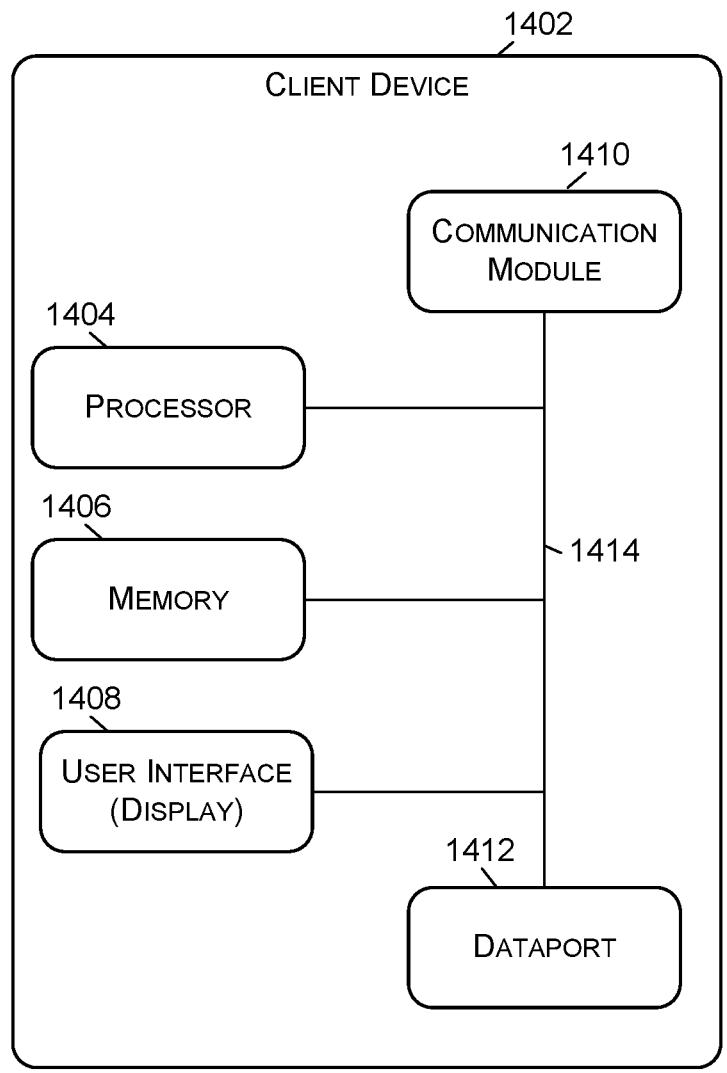
FIG. 14 is a functional block diagram of a client device on which the present embodiments may be implemented according to various aspects of the present disclosure.

FIG. 14 is a functional block diagram of a client device 1402 on which the present embodiments may be implemented according to various aspects of the present disclosure. The client device(s) 214, 216 described with reference to FIG. 2 may include some or all of the components and/or functionality of the client device 1402. The client device 1402 may comprise, for example, a smartphone.

With reference to FIG. 14, the client device 1402 includes a processor 1404, a memory 1406, a user interface 1408, a communication module 1410, and a dataport 1412. These components are communicatively coupled together by an interconnect bus 1414. The processor 1404 may include any processor used in smartphones and/or portable computing devices, such as an ARM processor (a processor based on the RISC (reduced instruction set computer) architecture developed by Advanced RISC Machines (ARM).). In some embodiments, the processor 2004 may include one or more other processors, such as one or more conventional microprocessors, and/or one or more supplementary co-processors, such as math co-processors.

The memory 1406 may include both operating memory, such as random-access memory (RAM), as well as data storage, such as read-only memory (ROM), hard drives, flash memory, or any other suitable memory/storage element. The memory 1406 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 1404 and the memory 1406 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1404 may be connected to the memory 1406 via the dataport 1412.

The user interface 1408 may include any user interface or presentation elements suitable for a smartphone and/or a portable computing device, such as a keypad, a display screen, a touchscreen, a microphone, and a speaker. The communication module 1410 is configured to handle communication links between the client device 1402 and other, external devices or receivers, and to route incoming/outgoing data appropriately. For example, inbound data from the dataport 1412 may be routed through the communication module 1410 before being directed to the processor 1404, and outbound data from the processor 1404 may be routed through the communication module 1410 before being directed to the dataport 1412. The communication module 1410 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1412 may be any type of connector used for physically interfacing with a smartphone and/or a portable computing device, such as a mini-USB port or an IPHONE®/IPOD® 30-pin connector or LIGHTNING® connector. In other embodiments, the dataport 1412 may include multiple communication channels for simultaneous communication with, for example, other processors, servers, and/or client terminals.

The memory 1406 may store instructions for communicating with other systems, such as a computer. The memory 1406 may store, for example, a program (e.g., computer program code) adapted to direct the processor 1404 in accordance with the present embodiments. The instructions also may include program elements, such as an operating system. While execution of sequences of instructions in the program causes the processor 1404 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 15:
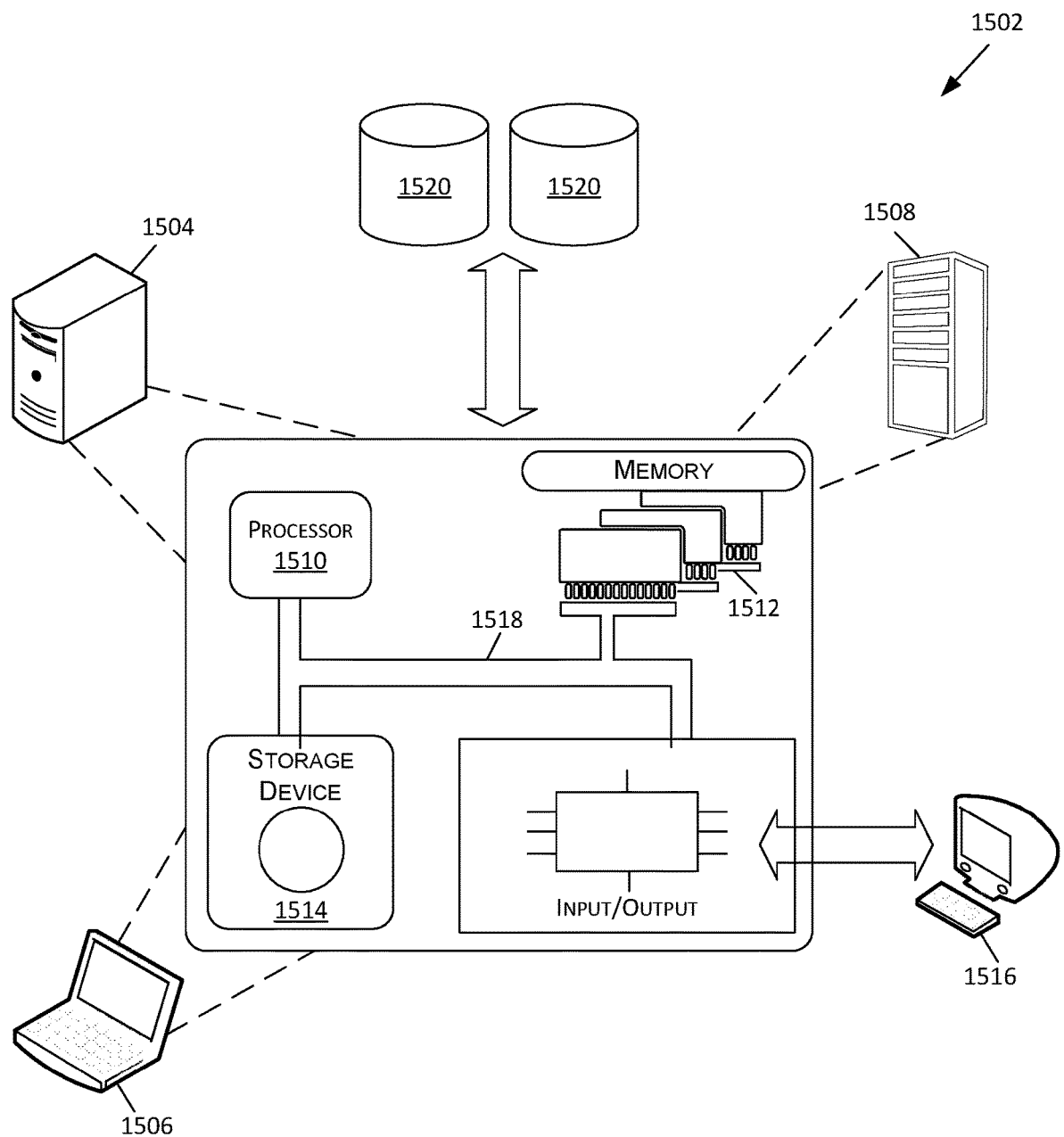
FIG. 15 is a functional block diagram of a general-purpose computing system on which the present embodiments may be implemented according to various aspects of present disclosure.

FIG. 15 is a functional block diagram of a general-purpose computing system on which the present embodiments may be implemented according to various aspects of the present disclosure. The computer system 1502 may be embodied in at least one of a personal computer (also referred to as a desktop computer) 1504, a portable computer (also referred to as a laptop or notebook computer) 1506, and/or a server 1508 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1502 may execute at least some of the operations described above. The computer system 2102 may include at least one processor 1510, memory 1512, at least one storage device 1514, and input/output (I/O) devices 1516. Some or all of the components 1510, 1512, 1514, 1516 may be interconnected via a system bus 1518. The processor 1510 may be single- or multi-threaded and may have one or more cores. The processor 1510 execute instructions, such as those stored in the memory 1512 and/or in the storage device 1514. Information may be received and output using one or more I/O devices 1516.

The memory 1512 may store information, and may be a computer-readable medium, such as volatile or non-volatile memory. The storage device(s) 1514 may provide storage for the system 2102 and, in some embodiments, may be a computer-readable medium. In various aspects, the storage device(s) 1514 may be a flash memory device, a hard disk device, an optical disk device, a tape device, or any other type of storage device.

The I/O devices 1516 may provide input/output operations for the system 1502. The I/O devices 1516 may include a keyboard, a pointing device, and/or a microphone. The I/O devices 1516 may further include a display unit for displaying graphical user interfaces, a speaker, and/or a printer. External data may be stored in one or more accessible external databases 1520.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

The various embodiments of the present touchless setup mode initiation for networked devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

Some networked devices—such as those that connect to a wireless local area network (WLAN, e.g., over Wi-Fi)—must be configured in order to connect to the network. For example, the networked device typically needs to receive credentials (e.g., a network name and/or a password) for the wireless network to which the networked device is to connect. Configuring such networked devices often involves the networked device's wireless communication hardware and/or software creating a wireless access point (WAP), or otherwise forming a temporary wireless network to which another device can connect. An example configuration process involves a computing device, such as a laptop or a smartphone, connecting to the networked device's temporary wireless network. Once connected, the laptop or smartphone configures the networked device's settings, such as by passing to the networked device credentials (e.g., a network name and/or a password) for the wireless network to which the networked device should connect after the configuration process is completed. This wireless configuration process may automatically begin the first time the networked device is powered on, to allow the user to configure a newly-purchased device. Some networked devices, however have physical buttons (e.g., "hard reset" buttons) that must be pressed in order to cause the networked device to enter into the configuration or setup mode, to allow the user to reconfigure the device. One aspect of the present embodiments includes the realization that some networked devices, such as security cameras, may be situated in hard-to-reach places, such that pressing a physical button on the device to initiate a configuration mode is not easily achieved. The present embodiments solve this problem by providing a mechanism for causing such devices to enter into the configuration mode or setup mode without requiring any physical contact with the device itself In a first aspect, a method for causing an audio/video (A/V) recording and communication device is provided. The method involves determining that the A/V device is disconnected from a local wireless network. The method also involves detecting motion, by one or more sensors of the A/V device, while the A/V device is disconnected from the local wireless network. The method further involves entering, by the A/V device after detecting the motion, a setup mode to initiate a setup proceduree. The setup procedure enables the A/V recording and communication device to wirelessly connect to a client device. Additionally, the method involves determining that the client device has not connected to the A/V device within a predetermined timeout period. Further, the method involves exiting the setup mode after the A/V device does not connect to the client device within the predetermined timeout period.

In an embodiment of the first aspect, the one or more sensors includes one or more passive infrared (PIR) sensors.

In an embodiment of the first aspect, entering the setup mode involves broadcasting, by the A/V device, a wireless network accessible to at least the client device.

In another embodiment of the first aspect, detecting the motion by the one or more sensors involves the one or more sensors generating a signal responsive to which a processor of the A/V device initiates the setup procedure.

In another embodiment of the first aspect, the method further involves receiving, by the A/V recording and communication device and from the client device, network credentials associated with the local network, and exiting the setup mode after the A/V recording and communication device receives the network credentials. The method may also involve connecting, by the A/V recording and communication device, to the local network based on at least the received network credentials.

In another embodiment of the first aspect, the predetermined time period is a first time period. In this embodiment, the method further involves establishing a wireless connection between the A/V recording and communication device and the client device, and determining, by the A/V recording and communication device, whether setup instructions are received from the client device within a second time period that is different from the first time period. The second time period may be longer than the first time period. Additionally, the second time period may begin after the wireless connection between the A/V recording and communication device and the client device is established. In this embodiment, the method may also involve exiting the setup mode when the A/V recording and communication device does not receive setup instructions from the client device within the second time period, where exiting the setup mode may include disconnecting the client device from the A/V recording and communication device.

Further, in this embodiment, the method may involve receiving, by the A/V recording and communication device, setup instructions from the client device and, upon receiving the setup instructions, exiting the setup mode. The setup instructions may include network credentials associated with the local network. Exiting the setup mode may involve disconnecting the A/V recording and communication device from the client device, and connecting, by the A/V recording and communication device, to the local network based on at least the received network credentials.

In another embodiment of the first aspect, entering the setup mode involves broadcasting, by the A/V recording and communication device, a wireless network accessible to at least the client device.

In another embodiment of the first aspect, the predetermined timeout period is two minutes.

In another embodiment of the first aspect, the one or more sensors generate a signal responsive to which a processor of the A/V recording and communication device initiates the setup procedure.

In another embodiment of the first aspect, detecting motion by the one or more sensors involves generating data indicative of motion of an object in a field of view of the A/V recording and communication device. The generated motion data may be indicative of a hand gesture, for example. The hand gesture may be, in some cases, a waving motion.

In a second aspect, a method for an audio/video (A/V) recording and communication device is provided. The method involves entering, by the A/V device, a reduced power mode based on at least a detection of a network connection error. The method also involves detecting motion. The method further involves entering a setup mode to initiate a setup procedure for wirelessly connecting. The setup procedure enables the A/V recording and communication device to wirelessly connect to the client device. Additionally, the method involves exiting the setup mode after the wireless connection between the A/V device and the client device is not established within a predetermined timeout period.

In an embodiment of the second aspect, the reduced power mode includes the use of passive infrared sensors for motion detection.

In another embodiment of the second aspect, the setup mode is exited if an association is not detected within a predetermined timeout period.

In another embodiment of the second aspect, entering the setup mode involves broadcasting, by the A/V recording and communication device, a wireless network accessible to at least the client device.

In a third aspect, a method for an audio/video (A/V) recording and communication device is provided. The method involves determining that the A/V device, which is configured to connect to a local wireless network, is unable to connect to the local wireless network. The A/V device enters a reduced power mode based on at least the determination that the A/V device is unable to connect to the local wireless network. The method also involves detecting motion by one or more sensors of the A/V device while the A/V device is in the reduced power mode. The method further involves providing, by the A/V device, a wireless access point for a predetermined timeout period to enable a client device to establish a direct wireless connection with the A/V device after detecting the motion.

In an embodiment of the third aspect, the one or more sensors includes one or more passive infrared (PIR) sensors.

In another embodiment of the third aspect, determining that the A/V recording and communication device is unable to connect to the local network includes attempting to establish a wireless connection with the local network based on at least previously-stored network credentials, and determining that the A/V recording and communication device is unable to connect to the local network using the previously-stored network credentials.

In another embodiment of the third aspect, the method further involves disabling the wireless access point when the client device does not establish a wireless connection with the A/V recording and communication device within the predetermined timeout period.

In another embodiment of the third aspect, the method further involves establishing the wireless connection between the A/V recording and communication device and the client device. The predetermined timeout period may be a first timeout period. In this embodiment, the method may also involve determining that no setup instructions are received from the client device during a second timeout period that is different from the first timeout period after establishing the wireless connection between the A/V recording and communication device and the client device. The method may also involve disabling the wireless access point based on at least the determination that no setup instructions are received from the client device during the second timeout period.

In this embodiment, the predetermined time period may be a first timeout period. The method may further involve receiving setup instructions from the client device during a second timeout period after establishing the direct wireless connection between the A/V recording and communication device and the client device. The setup instructions may include network credentials associated with the local network. The method according to this embodiment may also include disabling the wireless access point and, after receiving the setup instructions during the second timeout period, connecting, by the A/V recording and communication device, to the local network based on at least the received network credentials.

In another embodiment of the third aspect, the reduced power mode includes using the one or more sensors for motion detection.

In a fourth aspect, a method for an audio/video (A/V) recording and communication device ("A/V device") is provided. The method involves determining that the A/V device is disconnected from a local wireless network. The method also involves detecting motion by one or more sensors of the A/V device, while the A/V device is disconnected from the local wireless network. The method further involves entering, by the A/V device in response to detecting the motion, a setup mode to initiate a setup procedure for wirelessly connecting the A/V device to a client device. Additionally, the method involves determining that the client device has connected to the A/V device. Further, the method involves receiving, by the A/V device from the client device, network credentials associated with the local wireless network. The method additionally involves exiting the setup mode after the A/V device receives the network credentials.

In an embodiment of the fourth aspect, the method also involves connecting, by the A/V device, to the local wireless network based on at least the received network credentials.

In an embodiment of the fourth aspect, the predetermined timeout period is a first timeout period. The method according to this embodiment also involves establishing a wireless connection between the A/V device and the client device. The method according to this embodiment further involves determining, by the A/V device, that no setup instructions have been received from the client device within a second timeout period that is different from the first timeout period. Additionally, the method according to this embodiment involves exiting the setup mode when the A/V device does not receive the setup instructions from the client device within the second timeout period.

In this embodiment, the second timeout period may be longer than the first timeout period. In some implementations, the second timeout period begins after the wireless connection between the A/V device and the client device is established. Exiting the setup mode may involve disconnecting the client device from the A/V device.

What is claimed is:

1. A method comprising:
   determining, by an audio/video recording and communication device (A/V device) that the A/V device has disconnected from a first wireless network;
   detecting motion by the A/V device;
   based at least in part on the detecting of the motion, generating image data, by one or more cameras of the A/V device, while the A/V device is disconnected from the first wireless network;
   based at least in part on the determining that the A/V device disconnected from the first wireless network, processing, by the A/V device, the image data to determine that the image data represents the object performing a gesture;
   based at least in part on determining that the image data represents the object performing the gesture, broadcasting, by the A/V device, a second wireless network; and
   establishing, by the A/V device and using the second wireless network, a first wireless connection with a user device.

2. The method of claim 1, wherein the processing of the image data to determine that the image data represents the object performing the gesture occurs without the object making physical contact with the A/V device.

3. The method of claim 1, wherein the processing of the image data to determine that the image data represents the object performing the gesture comprises processing, by the A/V device, the image data to determine that the object is waving a hand.

4. The method of claim 1, further comprising:
   receiving, using the first wireless connection, network credential from the user device; and
   establishing, using the network credentials, a second wireless connection with the first wireless network.

5. The method of claim 1, further comprising:
   receiving, using the first wireless connection, network credential from the user device; and
   establishing, using the network credentials, a second wireless connection with a third wireless network.

6. The method of claim 1, wherein the processing of the image data to determine that the image data represents the object performing the gesture comprises:
   processing a first image represented by the image data to determine a first feature associated with the object;
   processing a second image represented by the image data to determine a second feature associated with the object; and
   determining that the object is performing the gesture based at least in part on the first feature and the second feature.

7. The method of claim 1, wherein the processing, by the A/V device, of the image data to determine that the image data represents the object performing a gesture comprises
   generating, for each respective frame of a plurality of frames represented by the image data, respective feature data, and
   identifying, based at least in part on generated feature data for two or more frames of the plurality of frames, a pattern indicating that the gesture has been performed by the object.

8. A method comprising:
   determining, by an audio/video recording and communication device (A/V device) that the A/V device has disconnected from a first wireless network;
   generating, by the A/V device, image data representing an object;
   based at least in part on the determining that the A/V device has disconnected from the first wireless network, processing, by the A/V device, the image data to determine that the image data represents the object performing a gesture;
   based at least in part on the image data representing the object performing the gesture, establishing, by the A/V device and using a second wireless network, a first wireless connection with a user device; and
   receiving, by the A/V device and using the first wireless connection, network credentials from the user device.

9. The method of claim 8, further comprising:
   detecting motion of the object using one or more passive infrared sensors of the A/V device,
   wherein the generating of the image data is based at least in part on the detecting of the motion.

10. The method of claim 8, further comprising:
    based at least in part on the determining that the A/V device has disconnected from the first wireless network, disabling one or more components of the A/V device;
    establishing, using the network credentials, a second wireless connection with at least one of the first wireless network or a third wireless network; and
    based at least in part on the establishing of the second wireless connection, activating the one or more components.

11. The method of claim 8, further comprising:
    based at least in part on the image data representing the object performing the gesture, broadcasting the second wireless network for a first period of time;
    at the elapse of the first period of time, ceasing the broadcasting of the second wireless network for a second period of time; and
    at the elapse of the second period of time, broadcasting the second wireless network for a third period of time,
    wherein the establishing of the first wireless connection with the user device occurs during the third period of time.

12. The method of claim 8, further comprising:
    based at least in part on the image data representing the object performing the gesture, broadcasting the second wireless network for a period of time,
    wherein the establishing of the first wireless connection with the user device occurs during the period of time.

13. The method of claim 8, wherein the generating of the image data occurs based at least in part on the determining that the A/V device has disconnected from the first wireless network.

14. The method of claim 8, wherein the receiving of the network credentials from the user device comprises receiving, by the A/V device and using the first wireless connection, at least a network identifier and a password from the user device.

15. An audio/video recording and communication device (A/V device) comprising:
    a camera;
    one or more processors; and
    one or more computer-readable media storing instructions that, when executed by the one or more processors, cause the A/V device to perform operations comprising:
    determining that the A/V device is unable to connect to a first wireless network;
    generating, using the camera, image data representing an object;
    based at least in part on the determining that the A/V device is unable to connect to the first wireless network, processing the image data to determine that the image data represents the object performing a gesture;
    based at least in part on the image data representing the object performing the gesture, broadcasting a second wireless network; and
    establishing, using the second wireless network, a first wireless connection with a user device.

16. The A/V device of claim 15, wherein the determining that the A/V device is unable to connect to the first wireless network comprises:
    attempting to establish a second wireless connection with the first wireless network using network credentials; and
    determining that the A/V device is unable to connect to the first wireless network using the network credentials.

17. The A/V device of claim 15, the operations further comprising:
    receiving, using the first wireless connection, network credentials from the user device; and
    ceasing the broadcasting of the second wireless connection.

18. The method A/V device of claim 15, the operations further comprising:
    receiving, using the first wireless connection, network credentials from the user device;

and
establishing a second wireless connection with the first wireless network using the network credentials.

19. The A/V device of claim 15, wherein the broadcasting of the second wireless network comprises sending network credentials, the network credentials for establishing the first wireless connection with the A/V device using the second wireless network.

20. An audio/video recording and communication device (A/V device) comprising:
a camera;
one or more processors; and
one or more computer-readable media storing instructions that, when executed by the one or more processors, cause the A/V device to perform operations comprising:
determining, that the A/V device has disconnected from a first wireless network;
generating, using the camera, image data representing an object
based at least in part on the determining that the A/V device has disconnected from the first wireless network, processing the image data to determine that the image data represents the object performing a gesture
based at least in part on the image data representing the object performing the gesture, receiving network credentials from a user device using a second wireless network; and establishing, using the network credentials, a first wireless connection to at least one of the first wireless network or a third wireless network.

21. The A/V device of claim 20, the operations further comprising:
based at least in part on the image data representing the object performing the gesture, establishing, using the second wireless network, a second wireless connection with the user device; and
disconnecting from the second wireless connection based at least in part on the receiving of the network credentials.

22. The A/V device of claim 21, the operations further comprising:
based at least in part on the determining that the A/V device has disconnected from the first wireless network, disabling one or more components of the A/V device; and
based at least in part on the establishing of the first wireless connection, activating the one or more components.

23. The A/V device of claim 21, the operations further comprising operating in a mode based at least in part on the determining that the A/V device has disconnected form the first wireless network, wherein the A/V device is configured to process the image data to detect the gesture when operating in the mode.

* * * * *